United States Patent
Ejima et al.

(10) Patent No.: US 9,894,416 B2
(45) Date of Patent: Feb. 13, 2018

(54) VIDEO RECEPTION DEVICE, INFORMATION DISPLAY METHOD, AND VIDEO RECEPTION SYSTEM

(71) Applicant: Panasonic Intellectual Property Management Co., Ltd., Osaka (JP)

(72) Inventors: Masataka Ejima, Osaka (JP); Kenji Takita, Osaka (JP); Mitsuhiro Mori, Osaka (JP); Hiroyuki Yoshida, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/892,195

(22) PCT Filed: May 27, 2014

(86) PCT No.: PCT/JP2014/002776
§ 371 (c)(1),
(2) Date: Nov. 18, 2015

(87) PCT Pub. No.: WO2015/004840
PCT Pub. Date: Jan. 15, 2015

(65) Prior Publication Data
US 2016/0119674 A1   Apr. 28, 2016

(30) Foreign Application Priority Data
Jul. 10, 2013  (JP) ................................ 2013-144250

(51) Int. Cl.
*H04H 60/45* (2008.01)
*H04N 21/458* (2011.01)
(Continued)

(52) U.S. Cl.
CPC ....... *H04N 21/458* (2013.01); *H04N 21/4122* (2013.01); *H04N 21/4126* (2013.01);
(Continued)

(58) Field of Classification Search
CPC combination set(s) only.
See application file for complete search history.

(56) References Cited

U.S. PATENT DOCUMENTS

2010/0185866 A1* 7/2010 Wang ................... H04L 12/585
713/176
2011/0234784 A1* 9/2011 Sugino ............... H04N 21/4223
348/77

(Continued)

FOREIGN PATENT DOCUMENTS

JP   2006-086717   3/2006
JP   2006-319819   11/2006
(Continued)

OTHER PUBLICATIONS

International Search Report of PCT application No. PCT/JP2014/002776 dated Sep. 2, 2014.

*Primary Examiner* — Kieu Oanh T Bui
(74) *Attorney, Agent, or Firm* — McDermott Will & Emery LLP

(57) ABSTRACT

A video receiving apparatus includes a receiver, a first display, an extractor, an information forming controller, a number-of-viewer detector, a communicator, and a display controller, leading to appropriate display of configuration information and associated information of a video content. The extractor extracts a partial content from the video content. The information forming controller forms the configuration information from the partial content. The number-of-viewer detector detects the number of viewers present within a predetermined area. The communicator receives an identifier transmitted from a mobile terminal having a second display. The display controller can selectively display the configuration information on the second display of the mobile terminal identified by the identifier, and displays the configuration information on at least one of the first and
(Continued)

second displays based on the number of the viewers and the number of the identifiers.

12 Claims, 17 Drawing Sheets

(51) Int. Cl.
  *H04N 21/41* (2011.01)
  *H04N 21/414* (2011.01)
  *H04N 21/442* (2011.01)
  *H04N 21/488* (2011.01)
  *H04N 21/81* (2011.01)
  *H04N 21/426* (2011.01)
  *H04N 21/436* (2011.01)
  *H04N 21/44* (2011.01)

(52) U.S. Cl.
  CPC .. *H04N 21/41407* (2013.01); *H04N 21/42684* (2013.01); *H04N 21/43615* (2013.01); *H04N 21/44008* (2013.01); *H04N 21/44218* (2013.01); *H04N 21/4886* (2013.01); *H04N 21/8133* (2013.01)

(56) References Cited

U.S. PATENT DOCUMENTS

2012/0066705 A1  3/2012 Harada et al.
2014/0325550 A1* 10/2014 Winograd ........ H04N 21/44236
                                                    725/19

FOREIGN PATENT DOCUMENTS

| JP | 2006-340136 | 12/2006 |
| JP | 2008-118665 | 5/2008 |
| JP | 2013-135411 | 7/2013 |
| WO | 2010/143388 | 12/2010 |

* cited by examiner

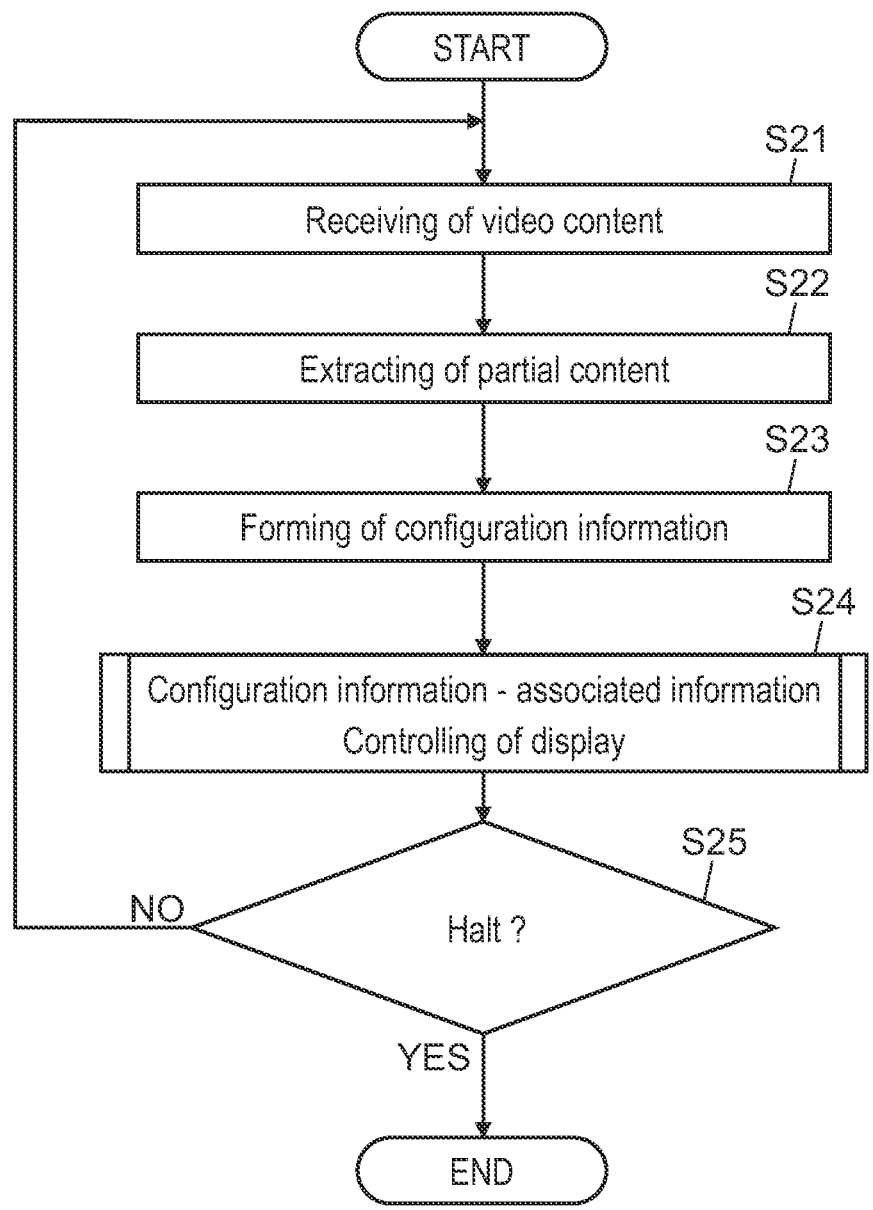

FIG. 7A
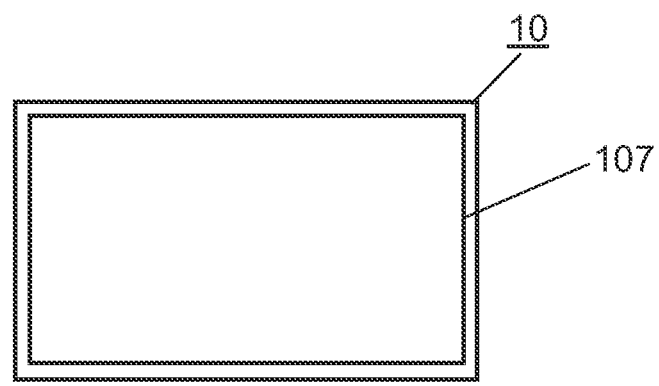
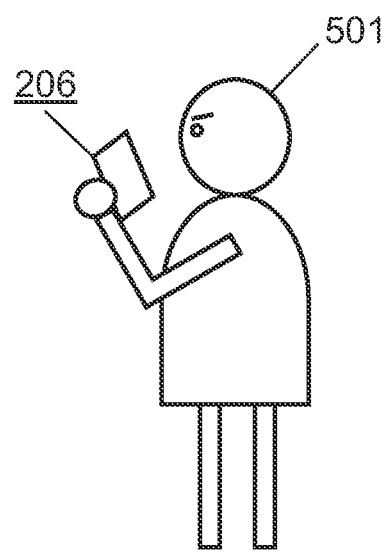

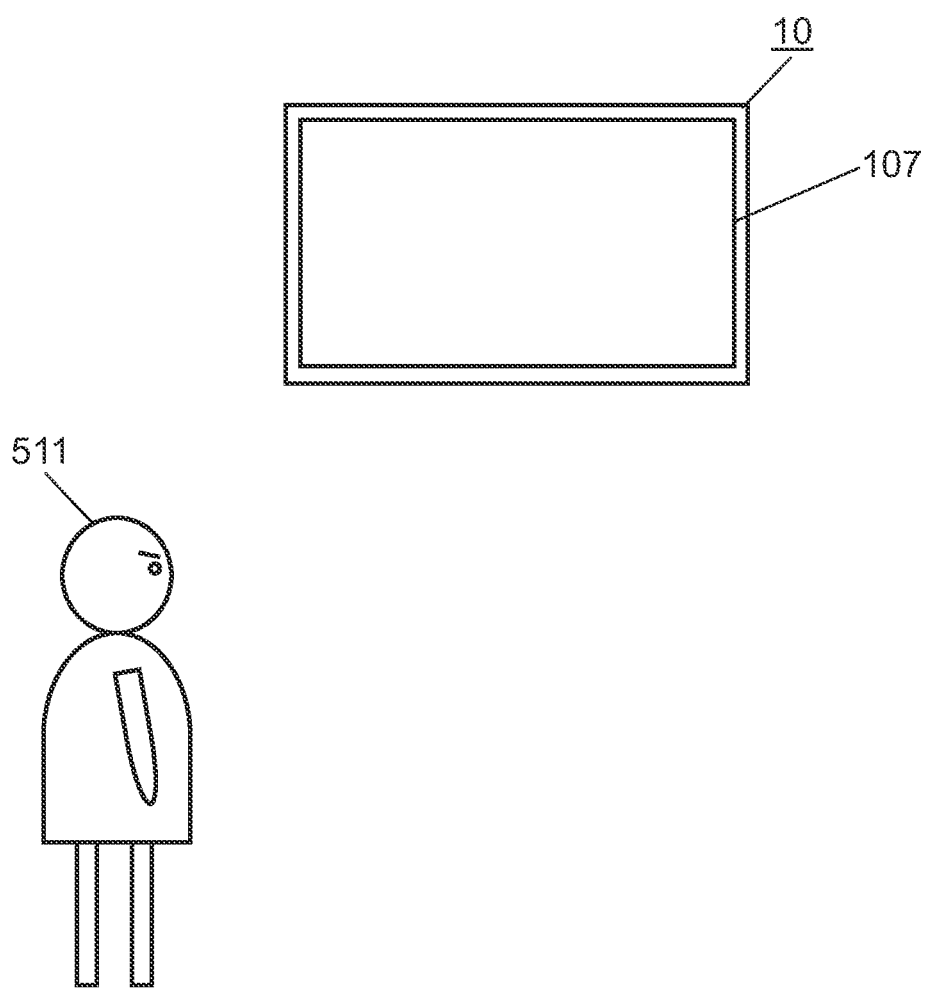

VIDEO RECEPTION DEVICE, INFORMATION DISPLAY METHOD, AND VIDEO RECEPTION SYSTEM

TECHNICAL FIELD

The present disclosure relates to video receiving apparatuses for displaying a video together with information associated with the video.

BACKGROUND ART

Patent Literature 1 discloses a method of reproducing a video, by which a desired scene is made viewable by retrieving it from the recorded video. In this method, character recognition of video information acquired from a broadcasted video is performed, thereby forming retrievable indexes of the video. The retrievable indexes are stored in a video-index forming-retrieving system. A viewer can retrieve a desired scene from the recorded video, by searching the indexes.

CITATION LIST

Patent Literature

PTL 1: Japanese Patent Unexamined Publication No. 2006-340136

SUMMARY

The present disclosure is intended to provide a video receiving apparatus, a method of displaying information, and a video receiving system which each are effective in appropriately displaying configuration information and associated information, both relating to a video content.

The video receiving apparatus according to the present disclosure includes a receiver, a first display, an extractor, an information forming controller, a number-of-viewer detector, a communicator, and a display controller. The receiver is configured to receive the video content. The first display is configured to display the video content received by the receiver. The extractor is configured to extract a partial content from the video content. The information forming controller is configured to form, from the partial content, the configuration information which contains either a character string or an image, relating to the partial content. The number-of-viewer detector is configured to detect the number of viewers present within a predetermined area. The communicator is configured to receive an identifier(s) of a single or a plurality of mobile terminals each having a second display, when the identifier(s) is (are) transmitted from the mobile terminal(s). The display controller is configured to be capable of transmitting the configuration information, selectively based on the identifier, to the mobile terminal identified by the identifier, and displaying the configuration information on the second display. The display controller is also configured to display the configuration information on at least one of the first display and the second display, based on the number of the viewers and the number of the identifiers.

BRIEF DESCRIPTION OF DRAWINGS

FIG. 3 is a flowchart of an operation of the video receiving apparatus according to the first embodiment.

FIG. 7A is a schematic view illustrating an example of situations where the number of viewers is equal to the number of IDs, according to the first embodiment.

FIG. 9A is a schematic view illustrating an example of situations where the number of IDs is 0 (zero), according to the first embodiment.

DESCRIPTION OF EMBODIMENTS

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the accompanying drawings and the following descriptions are presented to facilitate fully understanding of the present disclosure by those skilled in the art, and are not intended to impose any limitations on the subject matter described in the appended claims.

First Exemplary Embodiment

Hereinafter, a first embodiment will be described with reference to FIGS. 1 to 14.

[1-1. Configuration]

Figure 1:
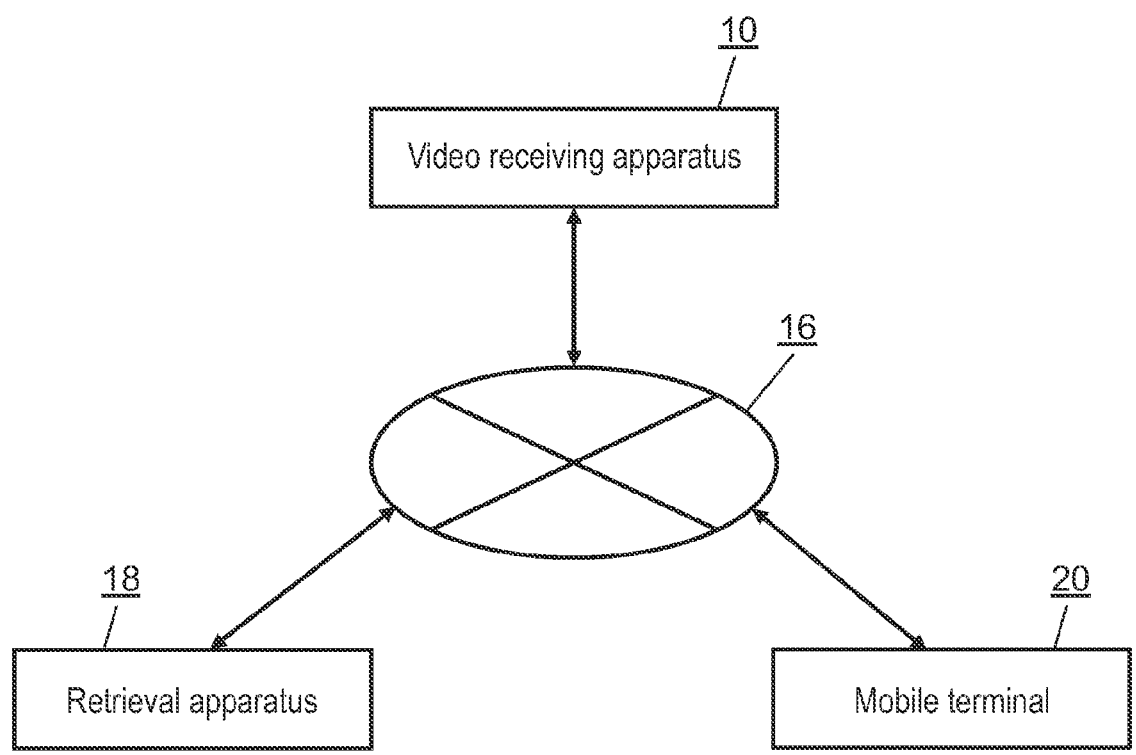
FIG. 1 is a schematic view illustrating an example of a configuration of a video receiving system according to a first embodiment.

FIG. 1 is a schematic view illustrating an example of a configuration of video receiving system 100 according to the first embodiment. Video receiving system 100 according to the embodiment includes video receiving apparatus 10 and a single or a plurality of mobile terminals 20. Although FIG. 1 shows only one mobile terminal 20, the number of mobile terminals 20 is set here only for the sake of convenience. As shown in FIG. 1, video receiving apparatus 10 and mobile terminal 20 are coupled with a communications line (referred to as "network," hereinafter) 16, which allows them to be capable of transmitting-receiving data to and from each other.

Network 16 is configured with a wired line, a wireless line, or a line both-mixed. Network 16 is the Internet, for example. The network, however, may be an intranet, a commercial communications line, another communications line (e.g. metro-network, company-network, home-network, and the like), or one mixed with them.

Retrieval apparatus 18 is a server coupled with network 16, that is, a Web site which renders an image retrieval service. Retrieval apparatus 18 is configured to perform the following service: Upon receiving image data transmitted via network 16, the retrieval apparatus retrieves data (e.g. a one's name, place name, shop name, designation, abbreviation, and the like) and returns them as a result of the retrieval. Such an image retrieval service may be a well-known service; therefore, its detailed description is omitted. Retrieval apparatus 18 may be configured to perform common-language-based retrieval (word retrieval), in addition to image retrieval. Moreover, retrieval apparatus 18 may also be configured to perform the following service: Upon receiving configuration information to be described later which is transmitted from video receiving apparatus 10, the retrieval apparatus returns information on an advertisement, advertising campaign, and the like which are associated with the configuration information.

Mobile terminal 20, e.g. a smartphone, is configured to be capable of transmitting and receiving data to and from video receiving apparatus 10 via network 16. Note that mobile terminal 20 may be another apparatus including a cellular telephone and a tablet terminal, for example. Mobile terminal 20 may be an information processing apparatus having a display to display a video. Such an information processing apparatus is only required to be capable of transmitting and receiving data to and from video receiving apparatus 10 via network 16, and to be operable by a viewer who is holding the processing apparatus in one or both hands.

Video receiving apparatus 10, e.g. a television receiver, is configured to display, on its display, a video in accordance with a broadcast signal or a video signal fed from the outside. Video receiving apparatus 10 is capable of transmitting and receiving data to and from mobile terminal 20 and retrieval apparatus 18 via network 16, and capable of retrieval (image retrieval and word retrieval) through use of retrieval apparatus 18.

It is noted, however, that video receiving system 100 permits a situation which involves no mobile terminal 20. Such a situation of mobile terminal 20 being absent includes the following cases: That is, a case where no mobile terminal 20 is coupled with network 16, a case where no mobile terminal 20 communicates with video receiving apparatus 10, and a case where no communications are performed between video receiving apparatus 10 and mobile terminal 20, for example. When the number of mobile terminal 20 is 0 (zero), video receiving apparatus 10 operates alone. Their operations will be described later in detail.

Figure 2:
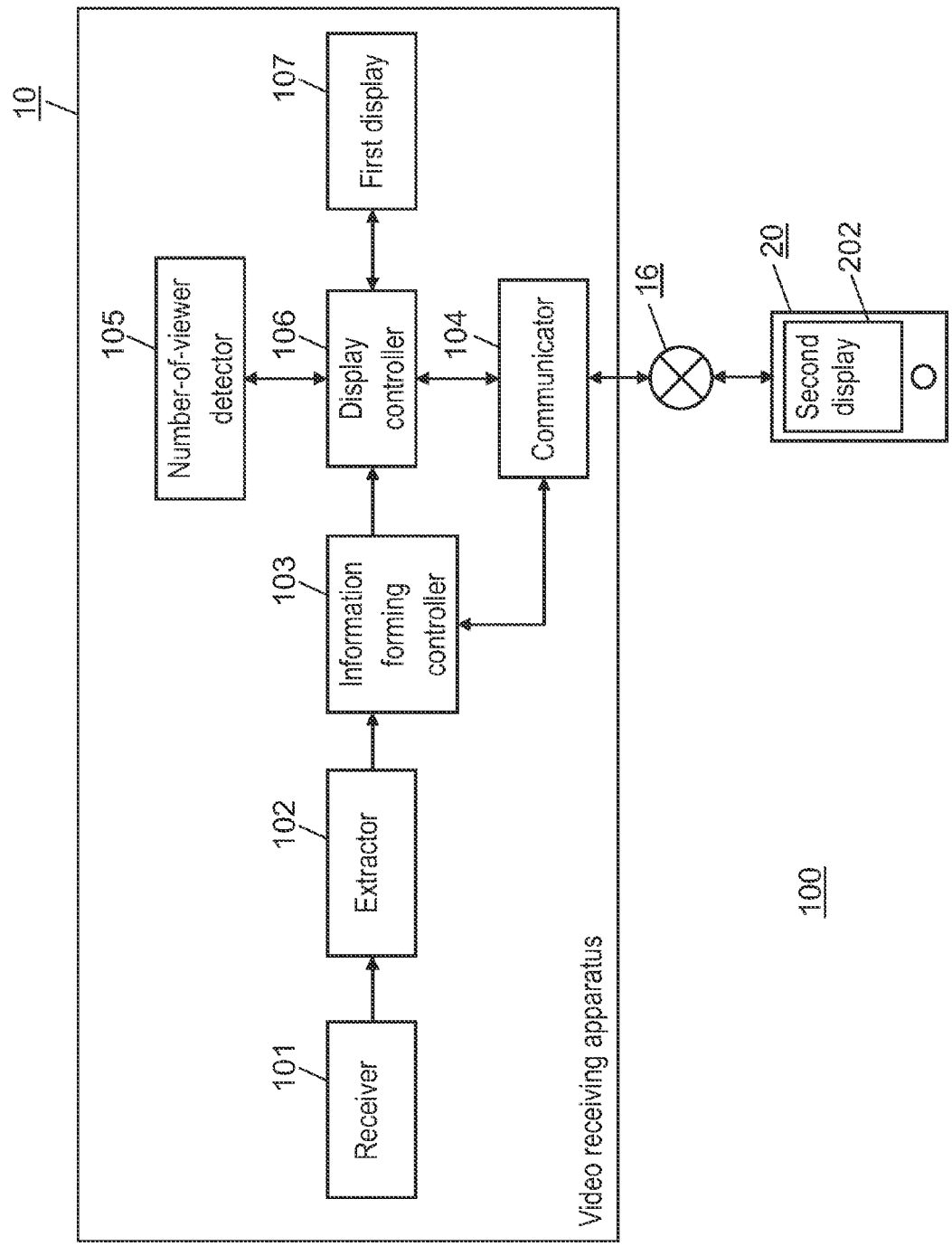
FIG. 2 is a schematic block diagram of a configuration of a video receiving apparatus according to the first embodiment.

FIG. 2 is a schematic block diagram of the configuration of video receiving apparatus 10 according to the first embodiment.

Note that, in FIG. 2, only major blocks are shown that relate to operations to be described in the embodiment, and the other blocks and functions relating to other operations are omitted for easy understanding of the operations described in the embodiment. Moreover, the blocks shown in FIG. 2 may be each configured with an independent circuit, or alternatively configured by executing a program, with a processor, which is intended to implement functions of a single or a plurality of the blocks shown in FIG. 2.

Video receiving apparatus 10 includes receiver 101, extractor 102, information forming controller 103, communicator 104, number-of-viewer detector 105, display controller 106, and first display 107.

Receiver 101 is configured to receive a video content and to output the received video content to extractor 102. The video content includes: contents broadcasted from a broadcast station via radio waves or a dedicated cable, contents of an internet protocol (IP) broadcast and the like delivered via a communications line, and contents stored in a storage medium, such as, a semiconductor storage medium or an optical (magnetic) storage medium. The video content is configured with a video (video signal); however, the video content may include a sound (audio signal) or information (meta-information) on the content per se. In addition, receiver 101 may include an antenna and receiver circuit (both not shown) for receiving the broadcast signal transmitted from the broadcast station, and a communication interface (not shown) for receiving the IP broadcast.

Extractor 102 is configured such that, upon receiving the video content output from receiver 101, the extractor analyzes the video content to extract a partial content, and then outputs the thus-extracted partial content to information forming controller 103. The partial content is part of the video content. The partial content includes the followings: That is, for example, an image (object image) where an object such as a person or article is displayed in a sub-region of a image contained in the video content, an image (character-region image) where characters (character string) are displayed in a sub-region of the image contained in the video content, a sound contained in the video content, and meta-information contained in the video content.

Information forming controller 103 is configured such that, upon receiving the partial content output from extractor 102, the information forming controller forms configuration information from the partial content, and then outputs the thus-formed configuration information to display controller 106. The configuration information is information which indicates the partial content, and is information which contains characters (character string) or an image.

Specifically, when the partial content is an object image, the configuration information is the object image itself, or alternatively the name (or abbreviation) of a person or article that is expressed by the object image. When the partial content is a character-region image, the configuration information is characters (character string) displayed in the character-region image. When the partial content is a sound, the configuration information is characters (character string) that are translated from the sound.

When the partial content is an object image, information forming controller 103 can form the configuration information through use of retrieval apparatus 18 that performs image retrieval. Information forming controller 103 transmits the image data of the object image to retrieval apparatus 18, via communicator 104 and network 16. Retrieval apparatus 18 performs the image retrieval based on the thus-received image data, and returns the result (name, abbreviation, or the like) of the retrieval to video receiving apparatus 10 via network 16. This image retrieval can be performed by means of a well-known technology. Information forming controller 103 receives the result of the retrieval that is returned from retrieval apparatus 18 via network 16 and communicator 104.

In this way, information forming controller 103 exchanges both the image data of the object image and the result of the retrieval with retrieval apparatus 18 via communicator 104 and network 16. This allows the information forming controller to translate the object image into a name of a person, article, or the like contained in the object image, thereby forming the configuration information (the name or abbreviation of the person or article) corresponding to the object image.

In cases where the partial content is a character-region image, information forming controller 103 can form configuration information by means of a well-known character recognition technology and a well-known morphological analysis. For example, information forming controller 103 extracts a text contained in the character-region image by means of the character recognition technology, and then breaks down the thus-extracted text into characters (character string) by means of the morphological analysis. In this way, information forming controller 103 can form the configuration information (the characters or the character string) corresponding to the character-region image.

In cases where the partial content is a sound, information forming controller 103 can form configuration information by means of a well-known voice recognition technology and the well-known morphological analysis. For example, information forming controller 103 extracts a text contained in the sound by means of the voice recognition technology, and then breaks down the thus-extracted text into characters (character string) by means of the morphological analysis. In this way, information forming controller 103 can form the configuration information (the characters or the character string) corresponding to the sound.

Communicator 104 is a communication interface which is configured to be capable of transmitting and receiving data to and from mobile terminal 20 and retrieval apparatus 18 via network 16. In addition, communicator 104 is also configured to be capable of receiving infrared communications from a remote controlling device (not shown, referred to as "remote controller," hereinafter) which is used for wireless operations of video receiving apparatus 10.

Communicator 104 is used when information forming controller 103 exchanges communications with retrieval apparatus 18. When the image data of the object image is output from information forming controller 103, communicator 104 receives the image data and converts them into data in a format in which the data are transmittable to network 16. Then, the communicator transmits the converted data to retrieval apparatus 18 via network 16. When a result of the retrieval concerning the data are transmitted from retrieval apparatus 18 via network 16, the communicator receives and transmits the result of the retrieval to information forming controller 103.

In addition, communicator 104 is used when display controller 106 exchanges communications with mobile terminal 20. Upon receiving an identifier (identification data, also abbreviated as "ID," hereinafter) transmitted from mobile terminal 20, communicator 104 outputs the ID to display controller 106. Such an ID is unique data assigned to mobile terminal 20, with the data being used to identify a plurality of mobile terminals 20 from one another. Upon receiving the configuration information output from display controller 106, communicator 104 transmits the configuration information to mobile terminal 20. This mobile terminal 20 is identified by the ID which communicator 104 has received in advance, and is being held (used) by a viewer. Mobile terminal 20 receives the configuration information and displays it on second display 202.

Moreover, communicator 104 is used when display controller 106 exchanges communications with retrieval apparatus 18 and mobile terminal 20. Upon receiving configuration information transmitted from mobile terminal 20, communicator 104 outputs the configuration information to display controller 106. The configuration information transmitted from mobile terminal 20 is information that is selected by the viewer from a plurality of pieces of the configuration information which is displayed on second display 202 of mobile terminal 20. In response to an instruction output from display controller 106, communicator 104 converts the received configuration information into data in a format in which the data are transmittable to network 16. Then, the communicator transmits the converted data to retrieval apparatus 18 via network 16. When information associated with the data (configuration information) is transmitted from retrieval apparatus 18 via network 16, the communicator receives the information and outputs it to display controller 106.

Note that such information (the information on the configuration information) transmitted from retrieval apparatus 18 includes: the result of the retrieval performed by retrieval apparatus 18 relating to the configuration information, and advertisements and/or advertising campaigns associated with the configuration information, for example. Hereinafter, pieces of such information are referred to as "associated information." In response to an instruction output from display controller 106, communicator 104 receives the associated information output from display controller 106 and then transmits it to mobile terminal 20. This mobile terminal 20 is the mobile terminal that is identified by the ID which communicator 104 has received in advance, and is the mobile terminal from which the configuration information has been transmitted. Mobile terminal 20 receives the associated information and displays it on second display 202.

Furthermore, communicator 104 is also used when display controller 106 exchanges communications with retrieval apparatus 18 and the remote controller. When the configuration information is output from display controller 106, communicator 104 receives the configuration information. The configuration information output from display controller 106 is configuration information that is selected by the viewer from the plurality of pieces of the configuration information which is displayed on first display 107 of video receiving apparatus 10. This selection may be performed by using the remote controller or, alternatively, performed by viewer's touching on a touch panel which is disposed on first display 107, for example.

In response to the instruction output from display controller 106, communicator 104 converts the configuration information into data in a format in which the data are transmittable to network 16. Then, the communicator transmits the converted data to retrieval apparatus 18 via network 16. When associated information associated with the data (configuration information) is transmitted from retrieval apparatus 18 via network 16, the communicator receives the associated information and transmits it to display controller 106. Then, display controller 106 displays the associated information on first display 107.

Number-of-viewer detector 105 is configured to count the number of viewers who are viewing the video content displayed on first display 107 of video receiving apparatus 10, and to transmit the counted number to display controller 106. Number-of-viewer detector 105 is provided with, for example, an imaging device (not shown) which is commonly used in digital cameras and the like. Using such an imaging device, the number-of-viewer detector photographs surroundings of video receiving apparatus 10, continuously or intermittently, to detect persons present within a predetermined area by means of well-known face detection technology and/or well-known human detection technology and the like. Then, the thus-detected persons are counted as viewers. Note that, in the embodiment, video receiving apparatus 10 is assumed to be used in a common living room. Accordingly, the predetermined region is set to be a region, within which first display 107 is viewable, defined by a distance of up to about 5 meters away from video receiving apparatus 10, for example. However, the embodiment is not limited to this configuration. The configuration may be such that: For example, video receiving apparatus 10 is expected to be used in public places, and to detect persons in such a manner that: Persons who stand still within a predetermined area for more than a predetermined time (e.g. one minute) are counted as viewers, whereas persons who pass in front of video receiving apparatus 10 are not counted as viewers. Alternatively, the configuration may also be such that: Using the well-known face detection technology, a person with his/her back toward video receiving apparatus 10 is not counted as a viewer. In addition, the predetermined region describe above is not limited to the numerical value described above, and is preferably set to be optimal in accordance with the size of first display 107.

Display controller 106 is configured to control both first display 107 and second display 202 based on the numbers, that is, the number of the viewers counted by number-of-viewer detector 105 and the number of the IDs of mobile terminals 20, with the IDs being received by communicator 104 (that is, the number of units of mobile terminals 20 currently being in communication with video receiving apparatus 10). Specifically, display controller 106 displays the configuration information described above on at least one of first display 107 and second display 202 based on the numbers, that is, the number of the viewers counted by number-of-viewer detector 105 and the number of the IDs of mobile terminals 20 which are received by communicator 104. Details of these operations will be described later.

Note that mobile terminal 20 is configured to perform the following operation: Through use of its communicator (not shown), mobile terminal 20 receives the configuration information and associated information which are transmitted from display controller 106 via communicator 104 and network 16. Then, mobile terminal 20 causes its display controller (not shown) to display, on second display 202, an image in accordance with the received configuration information and/or associated information. Apparently, this operation can be regarded as an operation of display controller 106 as if the display controller instructed second display 202 to display the configuration information and/or associated information. Hence, in the embodiment, the description occasionally uses the expression such as "display controller 106 of video receiving apparatus 10 displays configuration information and associated information on second display 202 of mobile terminal 20." In spite of this, such an expression substantially expresses the displaying operation that is performed by the mobile terminal, as just described above.

Moreover, upon receiving the configuration information transmitted from mobile terminal 20 via communicator 104, display controller 106 instructs communicator 104 to convert the configuration information into data in a format in which the data are transmittable to network 16 and then to transmit the converted data to retrieval apparatus 18 via network 16. The configuration information transmitted from mobile terminal 20 is configuration information that is selected by the viewer from the plurality of pieces of the configuration information which is displayed on second display 202 of mobile terminal 20, as described above. When associated information associated with the data (configuration information) is transmitted from retrieval apparatus 18 via network 16, display controller 106 receives the associated information via communicator 104. Then, display controller 106 instructs communicator 104 to transmit the thus-received associated information to mobile terminal 20 via network 16. This mobile terminal 20 is one that is identified by the ID which communicator 104 has received in advance, and is the mobile terminal from which the configuration information has been transmitted. Mobile terminal 20 receives the associated information and displays it on second display 202.

Moreover, when the viewer selects one from the plurality of pieces of the configuration information which is displayed on first display 107 of video receiving apparatus 10, display controller 106 specifies the thus-selected piece of the configuration information. This selection may be performed by using the remote controller or, alternatively, performed by viewer's touching on a touch panel which is disposed on first display 107, for example. Then, display controller 106 outputs the thus-specified configuration information to communicator 104. Then, the display controller instructs communicator 104 to convert the configuration information into data in a format in which the data are transmittable to network 16, and then to transmit the converted data to retrieval apparatus 18 via network 16. When associated information associated with the data (configuration information) is transmitted from retrieval apparatus 18 via network 16, display controller 106 receives the associated information via communicator 104. Then, display controller 106 displays the associated information on first display 107.

First display 107 is controlled by display controller 106 and is configured to display a video in accordance with, such as, the video content received by receiver 101, the configuration information and associated information which are output from display controller 106, and the like. First display 107 is a liquid crystal display (LCD), for example. However, the embodiment is not limited to this configuration; first display 107 may be another one including a plasma display panel (PDP) and an organic electro luminescence display (OLED). Moreover, first display 107 may be provided with a touch panel which can receive viewer's operations.

Mobile terminal 20 includes a receiver (not shown), a display controller (not shown), and second display 202.

The communicator is a communication interface, and is configured to be capable of transmitting and receiving data to and from video receiving apparatus 10 via network 16.

The display controller is configured to control second display 202 such that second display 202 displays images and characters.

Second display 202 is controlled by the display controller and is configured to display the images and the characters. Second display 202 is an LCD, for example; however, it may be another display including an OLED. Moreover, second display 202 may be provided with a touch panel which can receive viewer's operations.

In response to an instruction from the viewer who is holding mobile terminal 20, mobile terminal 20 transmits its own ID to video receiving apparatus 10 via its communicator and network 16. Upon receiving the ID, video receiving apparatus 10 recognizes the presence of mobile terminal 20, thereby starting to exchange communications between video receiving apparatus 10 and mobile terminal 20.

It is noted, however, that the embodiment is not limited to this configuration. For example, mobile terminal 20 may be configured to perform the following operation: That is, when software is started for mobile terminal 20 to exchange communications with video receiving apparatus 10 in response to the viewer's instruction, mobile terminal 20 automatically transmits the ID to video receiving apparatus 10, with the transmission per-se being one of the operations of the software. Alternatively, video receiving apparatus 10 and mobile terminal 20 are configured to perform the following operation: Video receiving apparatus 10 transmits an ID request signal to mobile terminal 20. Then, in response to the ID request signal, mobile terminal 20 transmits its ID to video receiving apparatus 10.

When the configuration information is transmitted from video receiving apparatus 10, mobile terminal 20 receives the configuration information via network 16 and the communicator. Then, the display controller displays the configuration information on second display 202.

When the viewer selects one from a plurality of pieces of the configuration information displayed on second display 202, the thus-selected piece of the configuration information is transmitted to video receiving apparatus 10 via the communicator and network 16. This selection may be performed by using an operation button (not shown) disposed in mobile terminal 20 or, alternatively, performed by viewer's touching on a touch panel which is disposed on second display 202.

When the associated information associated with the configuration information that has been transmitted from mobile terminal 20 is transmitted from video receiving apparatus 10, mobile terminal 20 receives the associated information via network 16 and communicator 104. Then, display controller 106 displays the associated information on second display 202.

[1-2. Operation]

An operation of thus-configured video receiving system 100 will be described.

FIG. 3 is a flowchart of the operation of video receiving apparatus 10 according to the first embodiment. The flowchart of FIG. 3 schematically illustrates the operation of video receiving apparatus 10, from the step of receiving a video content to the step of displaying configuration information and associated information.

Receiver 101 of video receiving apparatus 10 receives the video content (Step S21).

Extractor 102 of video receiving apparatus 10 analyzes the video content received by receiver 101, thereby extracting a partial content from the video content (Step S22).

Now the extraction of the partial content is described with reference to FIGS. 4A and 4B.

Figure 4A:
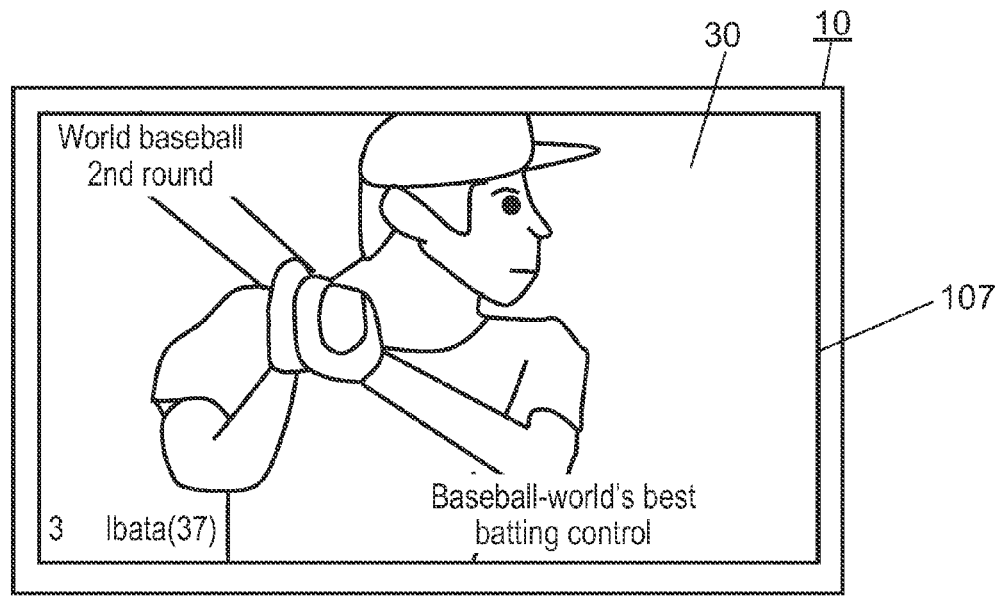
FIG. 4A is a view illustrating an example of a video content which is displayed on a first display of the video receiving apparatus according to the first embodiment.

FIG. 4A is a view illustrating an example of the video content which is displayed on first display 107 of video receiving apparatus 10 according to the first embodiment.

Figure 4B:
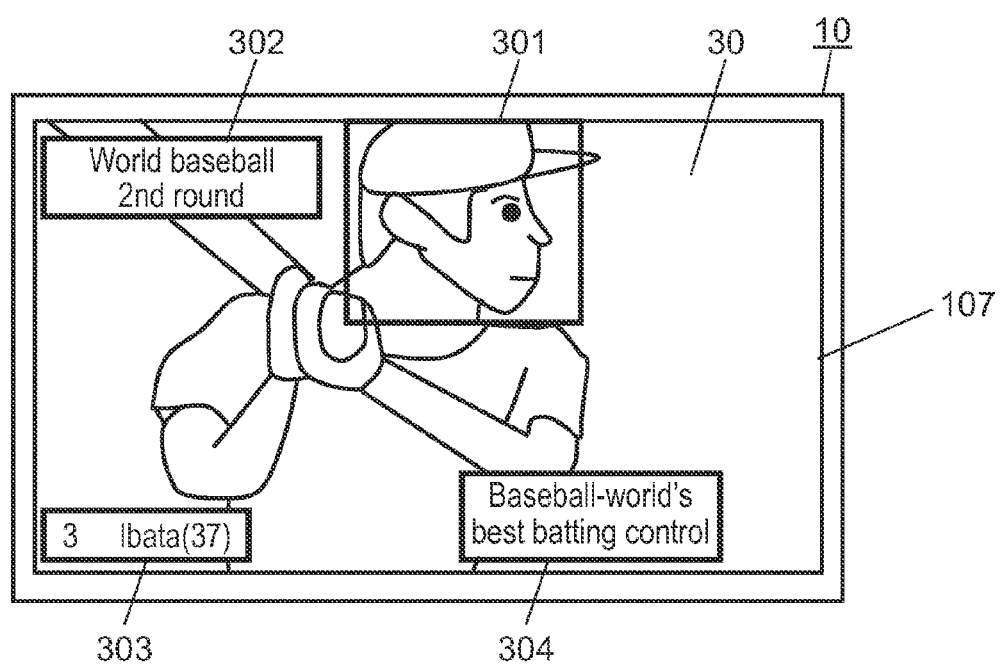
FIG. 4B is a schematic view illustrating an example of a partial content which is extracted by the video receiving apparatus according to the first embodiment.

FIG. 4B is a schematic view illustrating an example of the partial content which is extracted by video receiving apparatus 10 according to the first embodiment.

FIG. 4A shows a case where the video content is a baseball game broadcast and image 30, a scene of the game, is displayed on first display 107, with the image taking a close-up of a baseball player, for example.

FIG. 4B is shows a case where four partial contents are extracted from image 30 shown in FIG. 4A, for example. The four partial contents shown in FIG. 4B are: partial content 301 of an object image in which the face of the baseball player is extracted; partial content 302 of a character-region image in which the name of the baseball games and the like is extracted; partial content 303 of a character-region image in which the name of the player and the like is extracted; and partial content 304 of a character-region image in which the features of the player and the like are extracted. In other words, image 30 contains these four partial contents.

Hereinafter, a method will be described by which extractor 102 extracts these partial contents from image 30.

Extractor 102 extracts the following parts, as partial contents, from image 30. That is, a part (object image) containing an object (person, article, etc.) and a part (character-region image) containing characters (character string).

Here, the image containing the object is one which includes an image of the object and an image of surroundings of the object. The image containing characters (character string) is one which includes the characters (character string) and an image of surroundings of the characters (character string).

The extraction of the image of the person (face) may be made by means of well-known face recognition technology. The face recognition technology is one by which a face is recognized through the detection of face-feature parts such as eyes, nose, mouth, and contour of the face from a face image, for example. Such face-feature parts can be detected by means of a well-known template matching technology or the like, for example. Partial content 301 is extracted by means of such a technology, for example. In the same way, the extraction of the article can be made by means of the well-known template matching technology or the like.

The extraction of the characters (character string) may be made by means of the well-known character-region recognition technology. The character-region recognition technology is, for example, one in which colors configuring an image are binary-converted (for example, a color lighter than a threshold-value is converted into white, and a color darker than the threshold-value is converted into black), thereby separating the regions containing characters (character string) from the other regions. Partial contents 302, 303, and 304 can be extracted by means of this technology, for example.

In this way, extractor 102 extracts the four partial contents, i.e. partial contents 301, 302, 303, and 304, contained in image 30.

Note that, when the video content contains sounds or meta-information, extractor 102 may also extract the sounds or meta-information, as a partial content, from the video content. However, the description of this operation is omitted.

Now returning to FIG. 3, the flowchart is described.

Next, information forming controller 103 forms configuration information from the partial content extracted by extractor 102 (Step S23). The configuration information is information that indicates the partial content and includes the characters (character string) or the image. Information forming controller 103 may use retrieval apparatus 18, if necessary, when forming the configuration information.

Hereinafter, the configuration information is described.

Figure 5:
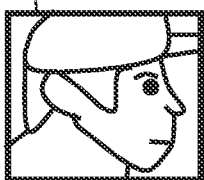
FIG. 5 is a schematic view illustrating an example of configuration information which is formed by the video receiving apparatus according to the first embodiment.

FIG. 5 is a schematic view illustrating an example of the configuration information formed by video receiving apparatus 10 according to the first embodiment. FIG. 5 shows association table 40 in which the partial contents are brought into correspondence with respective pieces of the configuration information associated with the four partial contents exemplified in FIG. 4B.

Information forming controller 103 forms the configuration information from the partial content extracted by extractor 102. The configuration information is information that indicates the partial content and includes the characters (character string) or the image.

For example, information forming controller 103 sets object image 401 extracted from partial content 301 to be the configuration information of partial content 301. It is noted, however, that partial content 301 is substantially equal to object image 401. Moreover, information forming controller 103 performs image retrieval of object image 401 through use of retrieval apparatus 18. The information forming controller receives, from retrieval apparatus 18, character string 402 (e.g. the name of the baseball player shown in object image 401) which is the result of the image retrieval, and then adds the character string to the configuration information of partial content 301. Note that what is acquired by the image retrieval as described above may be a plurality of character strings. Moreover, object image 401 and character string 402 may be combined and treated as one piece of configuration information.

Next, information forming controller 103 extracts, from partial content 302, character string 403 (e.g. the name of the baseball games and the like) that is contained partial content 302, and then sets the character string as configuration information of partial content 302.

In the same way, information forming controller 103 extracts, from partial content 303, character string 404 (e.g. the uniform number, name, age, etc. of the baseball player) that is contained partial content 303, and then sets the character string as configuration information of partial content 303.

In the same way, information forming controller 103 extracts, from partial content 304, character string 405 (e.g. the features of the baseball player and the like) that is contained partial content 304, and then sets the character string as configuration information of partial content 304.

Returning again to FIG. 3, the flowchart is described.

Next, display controller 106 controls first display 107 and second display 202 based on the following numbers (Step S24). That is, the number of viewers which is counted by number-of-viewer detector 105 and the number of the IDs of mobile terminals 20 (i.e. the number of mobile terminals 20 currently being in communication with video receiving apparatus 10) which is received by communicator 104.

In Step S24, based on the numbers of the viewers and the IDs, display controller 106 determines whether to select either one or both of first display 107 and second display 202 on which the configuration information (e.g. the configuration information shown in association table 40) is displayed. Then, based on the result of the determination, the display controller displays the configuration information on at least one of first display 107 and second display 202. Moreover, display controller 106 acquires, from retrieval apparatus 18, associated information associated with the configuration information that is selected by the viewer(s). Then, the display controller displays the thus-acquired associated information on the display (first display 107 or second display 202) of the apparatus with which the viewer's selection of the configuration information has been made.

Next, video receiving apparatus 10 determines whether an instruction to halt operation has been made or not (Step S25). In Step S25, when determining that the viewer has made the instruction to halt the operation (YES), video receiving apparatus 10 halts the operation of video receiving apparatus 10 itself. When determining that the viewer has not made any instruction to halt the operation (NO), video receiving apparatus 10 repeats a series of the operations described above until the viewer will make an instruction to halt the operation.

Next, details of Step S24 are described.

Figure 6:
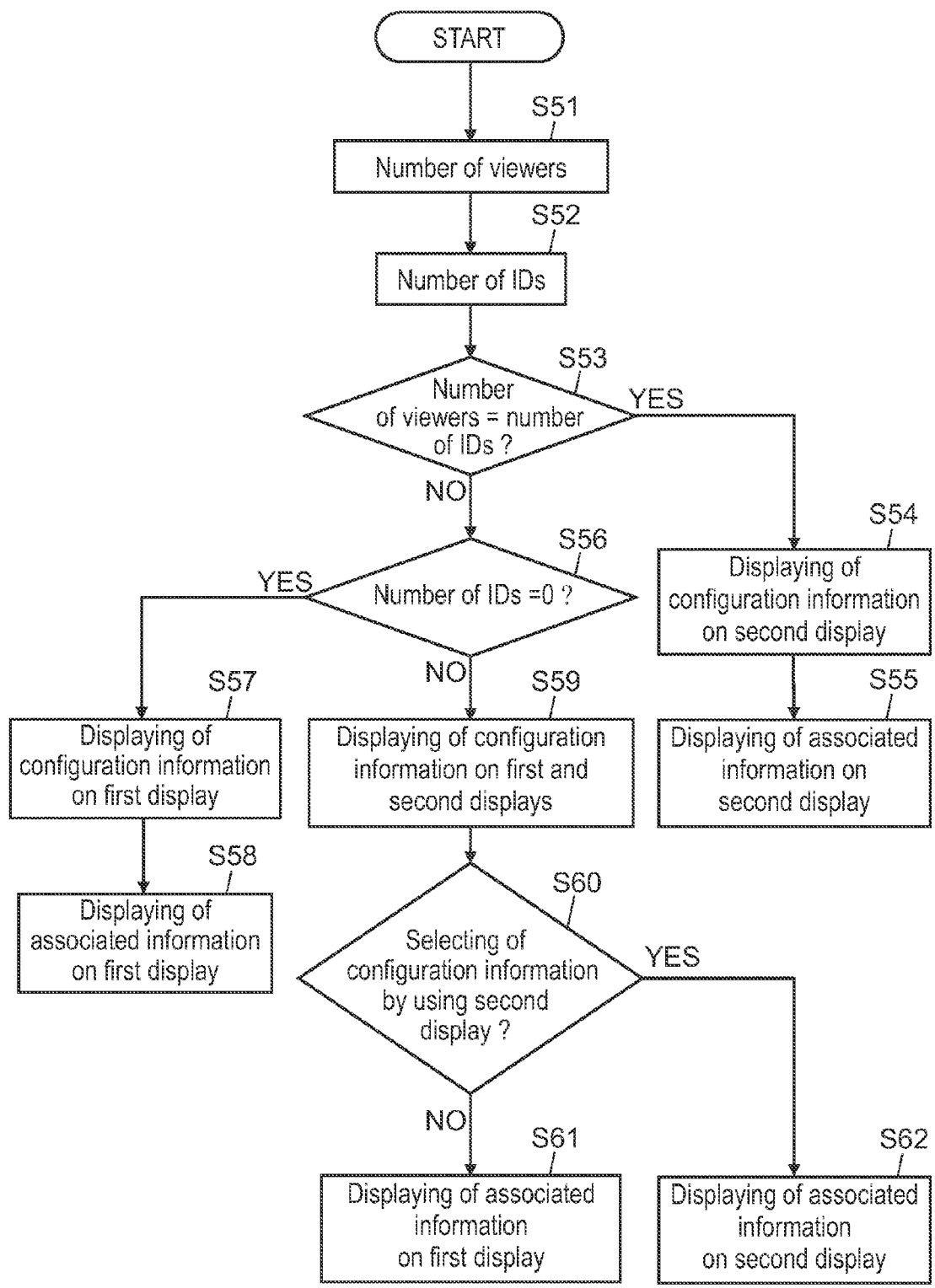
FIG. 6 is a flowchart of an operation of a display controller of the video receiving apparatus according to the first embodiment.

FIG. 6 is a flowchart of the operation of display controller 106 of video receiving apparatus 10 according to the first embodiment. FIG. 6 is a flowchart of details of Step S24. FIG. 6 shows the operation of display controller 106 when the display controller displays either the configuration information or the associated information on either one or both of first display 107 and second display 202.

Number-of-viewer detector 105 regards a person present within a predetermined area centering video receiving apparatus 10 as a viewer who is viewing the video content currently being displayed on first display 107, and then counts the number of the viewers. Hereinafter, the thus-counted number of the viewers is referred to as "number-of-viewer." Number-of-viewer detector 105 outputs the counted number-of-viewer to display controller 106 (Step S51).

Communicator 104 receives the ID transmitted from a single or a plurality of mobile terminals 20, and outputs the ID(s) to display controller 106. Display controller 106 counts the number of the ID (Step S52). The number of the IDs (hereinafter, referred to as "number-of-ID") substantially represents the number of units of mobile terminals 20 that are being in communication with video receiving apparatus 10.

Display controller 106 determines whether or not the number-of-viewer is equal to the number-of-ID (Step S53).

In Step S53, when determining that the number-of-viewer is equal to the number-of-ID (YES), display controller 106 displays the configuration information formed in Step S23 on second display 202 of mobile terminal 20 (Step S54). Note that mobile terminal 20 is a single or a plurality of mobile terminals 20 identified by the ID(s) that communicator 104 has received in advance. Moreover, at that time, display controller 106 does not display, on first display 107, the configuration information formed in Step S23.

Note that, in the embodiment, the expression that "the number-of-viewer is equal to the number-of-ID" substantially means the situation where "every viewer (a single viewer or a plurality of viewers) who is viewing the video content currently being displayed on first display 107, is holding mobile terminal 20 that is being in communication with video receiving apparatus 10."

Next, when the configuration information is transmitted from mobile terminal 20, display controller 106 receives the configuration information via communicator 104, and acquires, from retrieval apparatus 18, the associated information associated with the configuration information. Display controller 106 transmits, via communicator 104, the thus-acquired associated information to mobile terminal 20 from which the configuration information has been transmitted. Then, the display controller displays the associated information on second display 202 of mobile terminal 20 (Step S55). Note that the configuration information transmitted from mobile terminal 20 is information which is selected by the viewer from the plurality of pieces of the configuration information that is displayed on second display 202 of mobile terminal 20.

An example of the operations of Steps S54 and S55 will be described with reference to the accompanying figures.

FIG. 7A is a schematic view illustrating an example of case where the number-of-viewer is equal to the number-of-ID, according to the first embodiment.

Figure 7B:
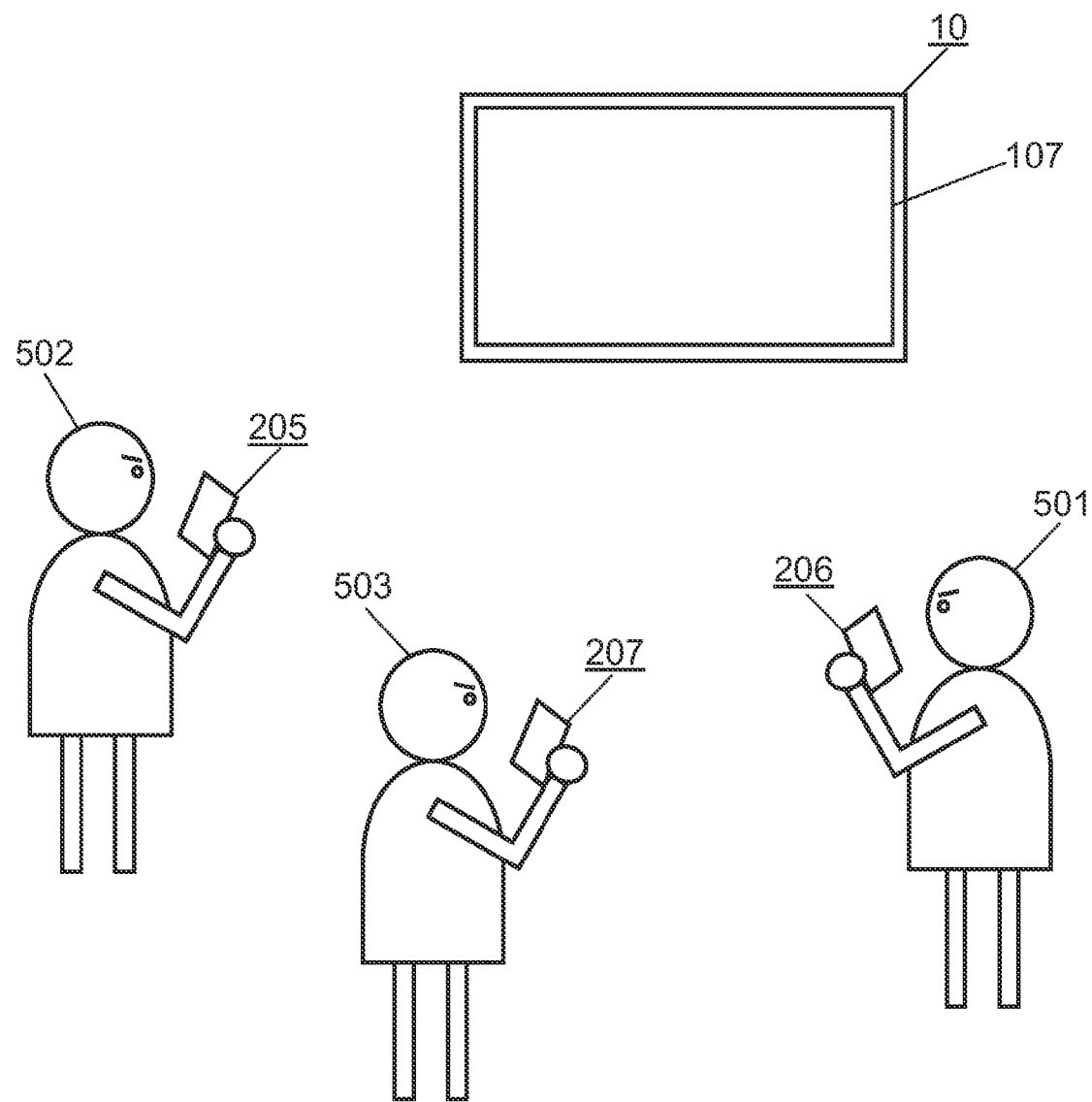
FIG. 7B is a schematic view illustrating another example of the situations where the number of viewers is equal to the number of IDs, according to the first embodiment.

FIG. 7B is a schematic view illustrating another example of the case where the number-of-viewer is equal to the number-of-ID, according to the first embodiment.

FIGS. 7A and 7B are the views also illustrating examples of situations where every viewer who is viewing the video content currently being displayed on first display 107, is holding mobile terminal 20 that is being in communication with video receiving apparatus 10.

In the case shown in FIG. 7A, one viewer 501 is viewing a video content currently being displayed on first display 107 of video receiving apparatus 10. Viewer 501 is holding mobile terminal 206 that is being in communication with video receiving apparatus 10. In this case, the number-of-viewer and the number-of-ID are each 1 (one) and equal to each other.

In the case shown in FIG. 7B, three viewers 501, 502, and 503 are viewing a video content currently being displayed on first display 107. Viewer 501 is holding mobile terminals 206 that is being in communication with video receiving apparatus 10. Viewer 502 is holding mobile terminals 205 that is being in communication with video receiving apparatus 10. Viewer 503 is holding mobile terminals 207 that is being in communication with video receiving apparatus 10. In this case, the number-of-viewer and the number-of-ID are each 3 (three) and equal to each other.

It is noted, however, that mobile terminals 205, 206, and 207 are each substantially equivalent to mobile terminal 20.

Figure 8A:
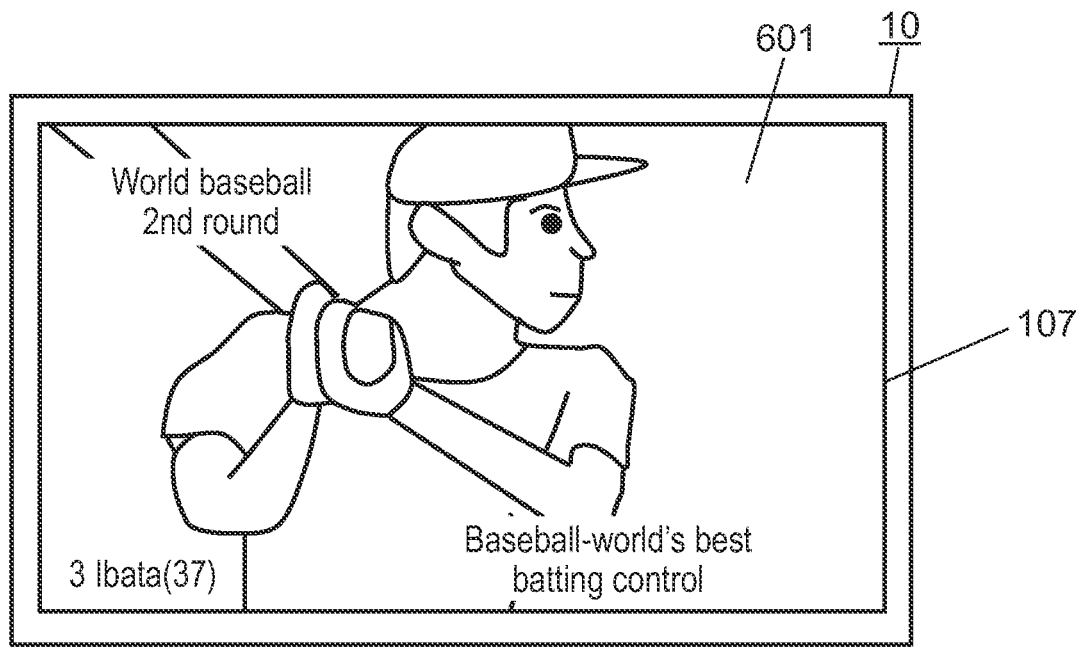
FIG. 8A is a view illustrating an example of a video content which is displayed on the first display of the video receiving apparatus when the number of viewers is equal to the number of IDs, according to the first embodiment.

FIG. 8A is a view illustrating an example of the video content which is displayed on first display 107 of video receiving apparatus 10 when the number-of-viewer and the number-of-ID are equal to each other, according to the first embodiment.

Figure 8B:
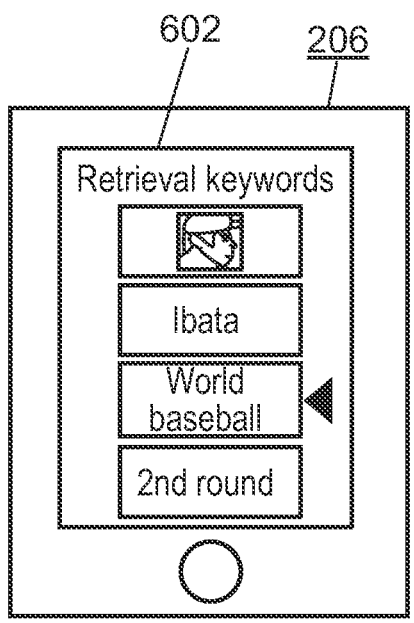
FIG. 8B is a view illustrating an example of the configuration information which is displayed on a second display of a mobile terminal when the number of viewers is equal to the number of IDs, according to the first embodiment.

FIG. 8B is a view illustrating an example of the configuration information which is displayed on second display 602 of mobile terminal 206 when the number-of-viewer and the number-of-ID are equal to each other, according to the first embodiment.

Figure 8C:
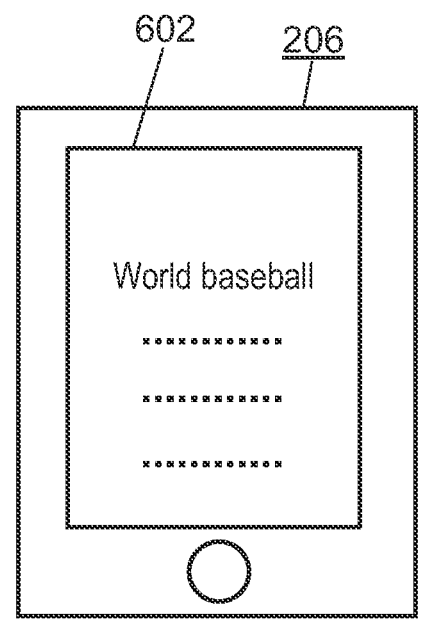
FIG. 8C is a view illustrating an example of associated information which is displayed on the second display when the number of viewers is equal to the number of IDs, according to the first embodiment.

FIG. 8C is a view illustrating an example of the associated information which is displayed on second display 602 of mobile terminal 206 when the number-of-viewer and the number-of-ID are equal to each other, according to the first embodiment.

Note that FIG. 8A shows a case where the video content is a baseball game broadcast and image 601, a scene of the game, is displayed on first display 107, with the image taking a close-up of a baseball player, for example. Note that image 601 is substantially identical to image 30 shown in FIG. 4A. Moreover, the following description will be made for the case of the image being displayed on first display 107.

For example, as shown in the exemplified cases in FIGS. 7A and 7B, when every viewer is holding mobile terminal 20 currently being in communication with video receiving apparatus 10, video receiving apparatus 10 can show the configuration information to the every viewer by displaying the configuration information on second display(s) 202 of mobile terminal(s) 20, without displaying the configuration information on first display 107.

Accordingly, in the embodiment, when the number-of-viewer and the number-of-ID are equal to each other, display controller 106 displays the configuration information formed in Step S23 on every second display 202 of all of mobile terminal(s) 20 (mobile terminal 206 in the case shown in FIG. 7A, mobile terminals 205, 206, and 207 in the case shown in FIG. 7B) which is (are) identified by the ID(s) that communicator 104 has received in advance (Step S54). FIG. 8B shows the case where the configuration information formed in Step S23 is displayed on second display 602 of mobile terminal 206. In the embodiment, such configuration information as shown in the exemplified case in FIG. 8B, is displayed on every second display 202 of all of mobile terminal(s) 20 that is (are) being in communication with video receiving apparatus 10. Note that second display 602 is substantially equivalent to second display 202.

At that time, as shown in the exemplified case in FIG. 8A, display controller 106 does not display the configuration information formed in Step S23 on first display 107. This is because every viewer who is viewing the video content currently being displayed on first display 107 is holding mobile terminal 20 being in communication with video receiving apparatus 10, which allows the display controller to show the configuration information to the every viewer via mobile terminal 20, without displaying the configuration information on first display 107.

Therefore, while checking the configuration information formed in Step S23 through use of mobile terminal 20 held in viewer's hand, the viewer(s) can view the video content currently being displayed on first display 107, without any decrease in viewability of the video content due to the display of the configuration information.

Next, when the viewer who is holding mobile terminal 20 selects one from the plurality of pieces of the configuration information currently being displayed on second display 202, the selected piece of the configuration information is transmitted from mobile terminal 20 to video receiving apparatus 10.

Video receiving apparatus 10 receives the configuration information transmitted from mobile terminal 20 and then acquires associated information associated with the thus-selected piece of the configuration information from retrieval apparatus 18. Then, video receiving apparatus 10 transmits the thus-acquired associated information to mobile terminal 20 from which the configuration information has been transmitted. Mobile terminal 20, from which the configuration information has been transmitted, receives the associated information and displays it on second display 202 (Step S55).

FIG. 8C shows the following case: That is, viewer 501, who is holding mobile terminal 206, selects one from the plurality of pieces of the configuration information currently being displayed on second display 602. Then, associated information associated with the selected piece of the configuration information is displayed on second display 602 of mobile terminal 206. In the embodiment, such associated information as shown in the exemplified case in FIG. 8C is displayed on second display 202 of mobile terminal 20 with which the selection of the configuration information has been made, with the configuration information having served as a base for the formation of the associated information. Note that, although FIG. 8C shows the case where only the associated information is displayed on the entire screen of second display 602, both the configuration information and the associated information may be displayed simultaneously on second display 202.

At that time, display controller 106 does not display the associated information on first display 107. Moreover, display controller 106 displays the associated information associated with the configuration information only on second display 202 of mobile terminal 20 with which the selection of the configuration information has been made, and does not display this associated information on any second displays 202 of the other mobile terminals 20.

Therefore, while checking the associated information associated with the configuration information, which the viewer has selected, through use of mobile terminal 20 held in viewer's hand, the viewer can view the video content currently being displayed on first display 107, without any decrease in viewability of the video content due to the display of the associated information. Moreover, associated information associated with the configuration information, which another viewer has selected, is not displayed on second display 202 of mobile terminal 20 held in the viewer's hand. This allows prevention of such inconvenience that associated information not desired by this viewer is displayed on second display 202 of the viewer's terminal. With this configuration, for example, it is also possible to prevent a decrease in the amount of the configuration information displayed on second display 202 due to such associated information displayed undesirably for the viewer.

Note that mobile terminal 20 may transmit the configuration information together with its own ID to video receiving apparatus 10. This transmission allows video receiving apparatus 10 to grasp which mobile terminal 20 has transmitted the configuration information. Then, in transmitting the associated information associated with the configuration information, video receiving apparatus 10 can transmit the associated information to mobile terminal 20 that is identified by the ID.

Note that, when the viewer selects the piece of the configuration information, the information transmitted from mobile terminal 20 to video receiving apparatus 10 is not necessarily the selected piece of the configuration information itself. Instead of this, the information transmitted from mobile terminal 20 to video receiving apparatus 10 may be information (e.g. a header of the configuration information, or the like) for specifying the selected piece of the configuration information.

Referring now back to FIG. 6, the flowchart is described.

In Step S53, when the number-of-viewer and the number-of-ID are determined to be different from each other (NO), display controller 106 determines whether or not the number-of-ID is 0 (zero) or not (i.e. an integer not smaller than one) (Step S56).

Note that, in the embodiment, the expression that "the number-of-ID is 0 (zero)" substantially means the following situation: That is, "every viewer who is viewing the video content currently being displayed on first display 107 is not holding any mobile terminal 20. Alternatively, even if a viewer is present there who is holding mobile terminal 20, mobile terminal 20 of the viewer is not being in communication with video receiving apparatus 10."

In Step S56, when the number-of-ID is determined to be 0 (zero) (YES), display controller 106 displays the configuration information formed in Step S23 on first display 107 of video receiving apparatus 10 (Step S57).

When the viewer selects one from the plurality of pieces of the configuration information displayed on first display 107, display controller 106 acquires the associated information associated with the selected piece of the configuration information from retrieval apparatus 18 and then displays the thus-acquired associated information on first display 107 (Step S58).

An example of the operations in Steps S57 and S58 will be described with reference to the accompanying figures.

FIG. 9A is a schematic view illustrating an example of situations where the number-of-ID is 0 (zero), according to the first embodiment.

Figure 9B:
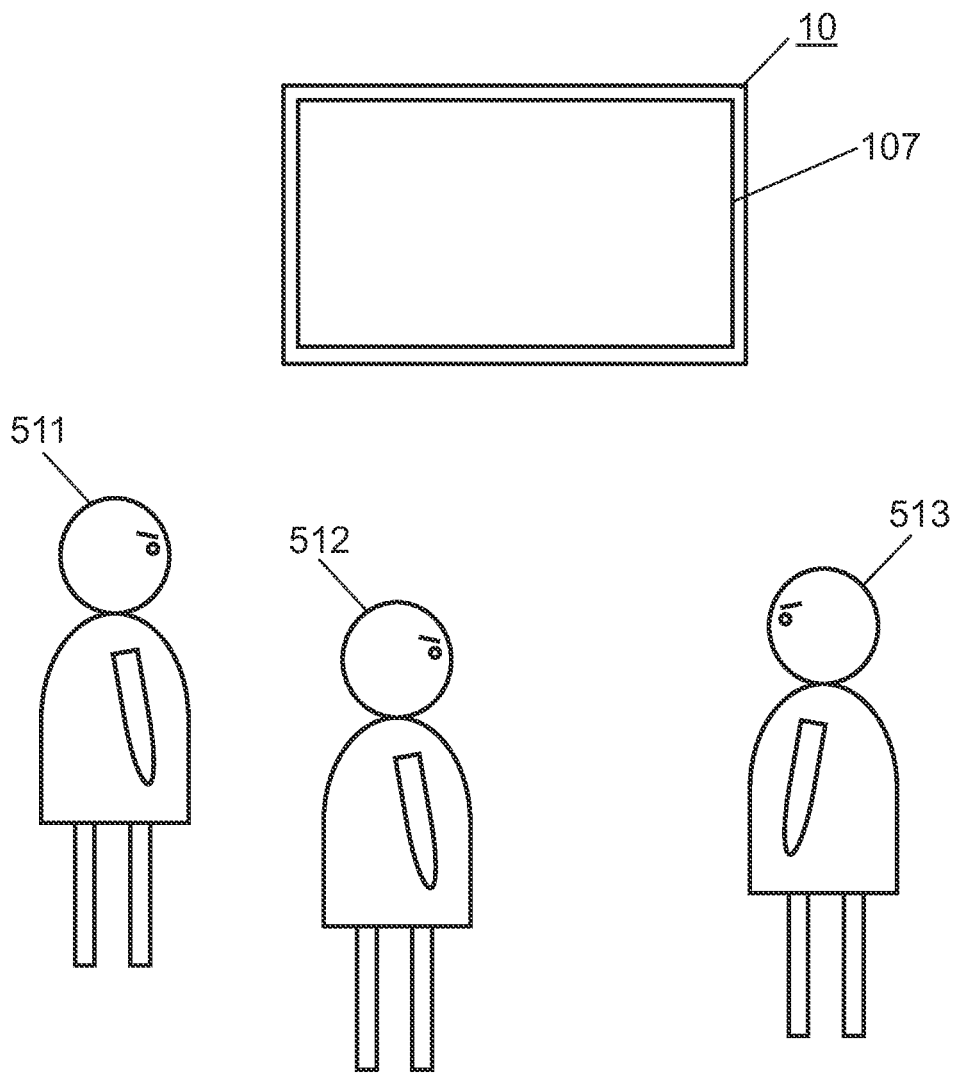
FIG. 9B is a schematic view illustrating another example of the situations where the number of IDs is 0 (zero), according to the first embodiment.

FIG. 9B is a schematic view illustrating another example of the situations where the number-of-ID is 0 (zero), according to the first embodiment.

FIGS. 9A and 9B are the views illustrating the examples in which every viewer who is viewing a video content currently being displayed on first display 107 is not holding any mobile terminal 20.

In the example shown in FIG. 9A, one viewer 511 is viewing the video content displayed on video receiving apparatus 10 and viewer 511 is not holding any mobile terminal 20. It is noted, however, that, even if viewer 511 is holding mobile terminal 20 (not shown) which is not being in communication with video receiving apparatus 10, such a situation is substantially identical to the situation shown in FIG. 9A.

In the example shown in FIG. 9B, three viewers 511, 512, and 513 are viewing the video content displayed on video receiving apparatus 10 and all of viewers 511, 512, and 513 are not holding any mobile terminal 20. It is noted, however, that, even if a part or all of viewers 511, 512, and 513 are each holding mobile terminal 20 (not shown) which is not being in communication with video receiving apparatus 10, such a situation is substantially identical to the situation shown in FIG. 9B.

Figure 10A:
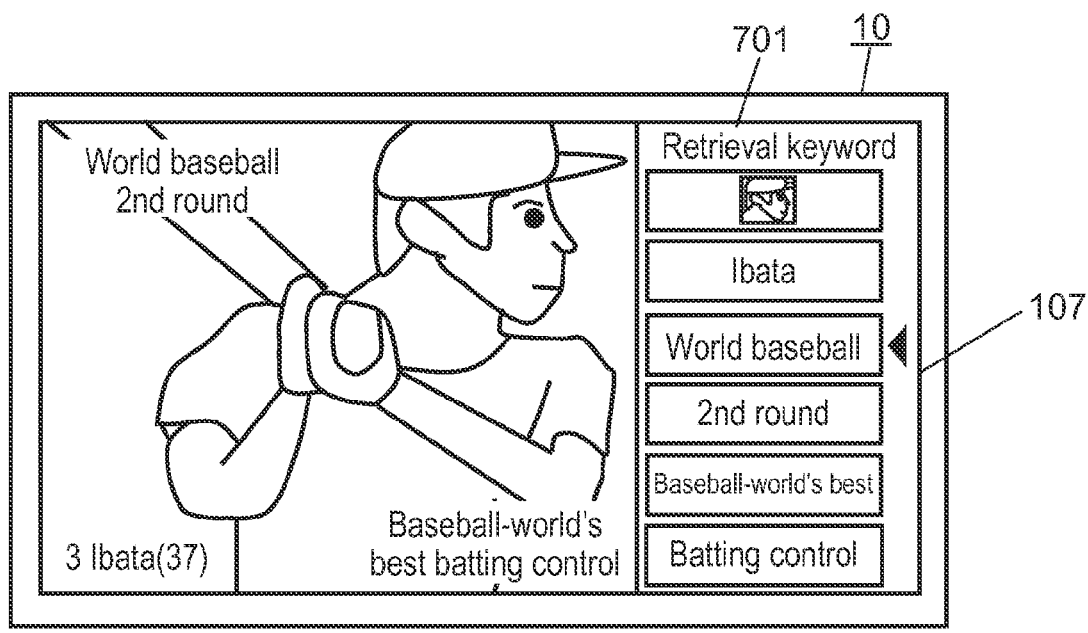
FIG. 10A is a schematic view illustrating an example of the configuration information that is displayed on the first display of the video receiving apparatus when the number of IDs is 0 (zero), according to the first embodiment.

FIG. 10A is a schematic view illustrating an example of the configuration information that is displayed on first display 107 of video receiving apparatus 10 when the number-of-ID is 0 (zero), according to the first embodiment.

Figure 10B:
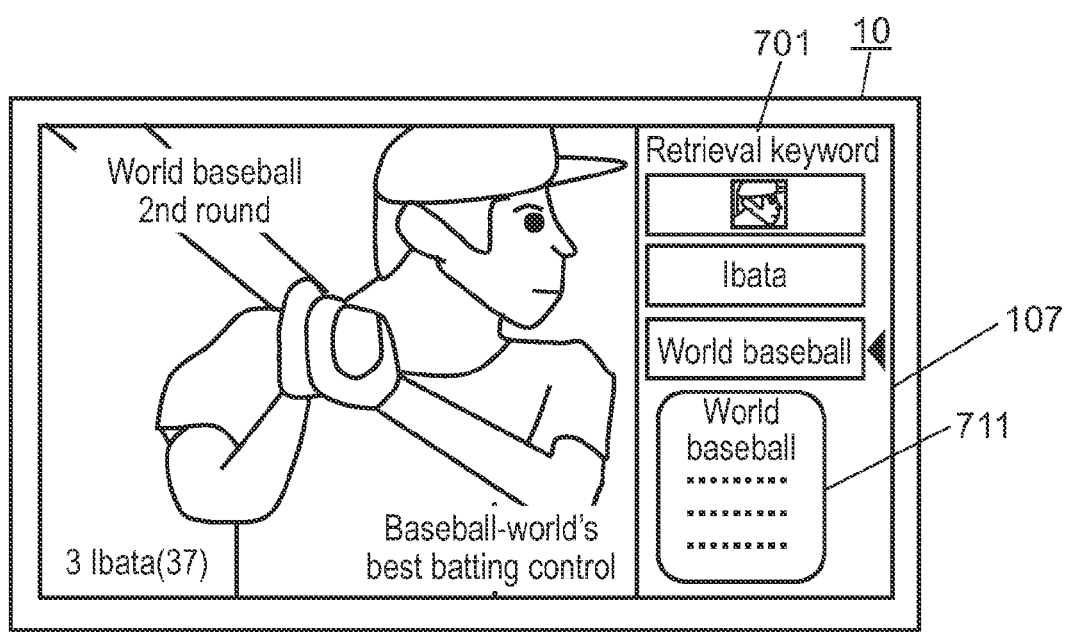
FIG. 10B is a schematic view illustrating an example of the associated information that is displayed on the first display of the video receiving apparatus when the number of IDs is 0 (zero), according to the first embodiment.

FIG. 10B is a schematic view illustrating an example of the associated information that is displayed on first display 107 of video receiving apparatus 10 when the number-of-ID is 0 (zero), according to the first embodiment.

For example, when every viewer is not holding any mobile terminal 20 as shown in the exemplified cases in FIGS. 9A and 9B, in order to show the configuration information formed in Step S23 to all the viewers, display controller 106 displays image 701 on first display 107. The image shows the configuration information, as shown in the exemplified case in FIG. 10A (Step S57).

Next, when the viewer of the video content being displayed on first display 107 selects one from the plurality of pieces of the configuration information currently being displayed on first display 107, display controller 106 acquires associated information associated with the thus-selected piece of the configuration information from retrieval apparatus 18. Then, in order to show the acquired associated information to the viewer who has made the selection, display controller 106 displays image 711 in a region within image 701 currently being displayed on first display 107. The image 711 shows the acquired associated information as shown in the exemplified case in FIG. 10B (Step S58).

Referring now back to FIG. 6, the flowchart is described.

In Step S56, when the number-of-ID is determined to be not 0 (zero) (i.e. the number-of-ID is not smaller than one) (NO), display controller 106 displays the configuration information formed in Step S23 on second display 202 of mobile terminal 20. Note that mobile terminal 20 is a single or a plurality of mobile terminals 20 identified by the ID(s) which has (have) been received by communicator 104 in advance. In addition, display controller 106 displays the configuration information also on first display 107 of video receiving apparatus 10 (Step S59).

Note that, in the embodiment, the determination in Step S56 that "the number-of-ID is not 0 (zero)" is made when the situation is as follows: That is, "the number of the viewers viewing the video content currently being displayed on first display 107 is not smaller than 2 (two). Then, the viewer(s) holding mobile terminal(s) 20 currently being in communication with video receiving apparatus 10 coexists (coexist) with the viewer(s) holding no mobile terminal(s) 20 (or, alternatively, coexists (coexist) with the viewer(s) holding mobile terminal(s) 20 being not in communication with video receiving apparatus 10)." In Step S59, therefore, in order to show the configuration information formed in Step S23 to the viewer(s) not holding mobile terminal(s) 20, display controller 106 also displays the configuration information on first display 107 of video receiving apparatus 10.

It is noted, however, that a situation where the number-of-viewer is smaller than the number-of-ID is not expected in the embodiment. If the situation where the number-of-viewer is smaller than the number-of-ID occurs, display controller 106 determines that number-of-viewer detector 105 does not correctly detect the number-of-viewer. Based on the determination, the display controller corrects the number-of-viewer such that either the number-of-viewer is equal to the number-of-ID or the number-of-viewer is larger than the number-of-ID. At that time, the way of how to correct the number-of-viewer may be appropriately employed in accordance with specifications of video receiving apparatus 10 and the like.

Next, when the viewer selects the configuration information, display controller 106 determines whether the selection is made by using second display 202 of mobile terminal 20 or the selection is made by using first display 107 of video receiving apparatus 10 (Step S60).

When the viewer selects one from the plurality of pieces of the configuration information displayed on first display 107, display controller 106 determines in Step S60 that the selection of the configuration information is made by using first display 107 of video receiving apparatus 10 (NO). Then, display controller 106 acquires associated information associated with the selected piece of the configuration information from retrieval apparatus 18 and displays the acquired associated information on first display 107 (Step S61).

Note that, in order to select one from the plurality of pieces of the configuration information displayed on first display 107, the viewer performs an operation of, such as, operating a remote controller, touching on a touch panel provided that the touch panel is set on first display 107, or the like, for example. Accordingly, by detecting such a operation, display controller 106 can determine that the selection of the configuration information is made by using first display 107 of video receiving apparatus 10.

When the configuration information is transmitted from mobile terminal 20, display controller 106 receives the configuration information via communicator 104. This allows display controller 106 to determine in Step S60 that the selection of the configuration information is made by using second display 202 of mobile terminal 20 (YES). The configuration information transmitted from mobile terminal 20 is the information that is selected by the viewer from the plurality of pieces of the configuration information displayed on second display 202 of mobile terminal 20.

It is noted, however, that the embodiment is not limited to this configuration. For example, mobile terminal 20 may be configured to transmit its own ID together with the configuration information selected by the viewer. Then, by detecting such an ID, display controller 106 can determine that the selection of the configuration information is made by using second display 202 of mobile terminal 20.

Display controller 106 acquires the associated information associated with the selected piece of the configuration information from retrieval apparatus 18. Then, the display controller transmits, via communicator 104, the thus-acquired associated information associated with the configuration information to mobile terminal 20 from which the configuration information has been transmitted, thereby displaying the associated information on second display 202 of mobile terminal 20 (Step S62).

Here, an example of operations of Steps S59, S61, and S62 will be described with reference to the accompanying drawings.

Figure 11A:
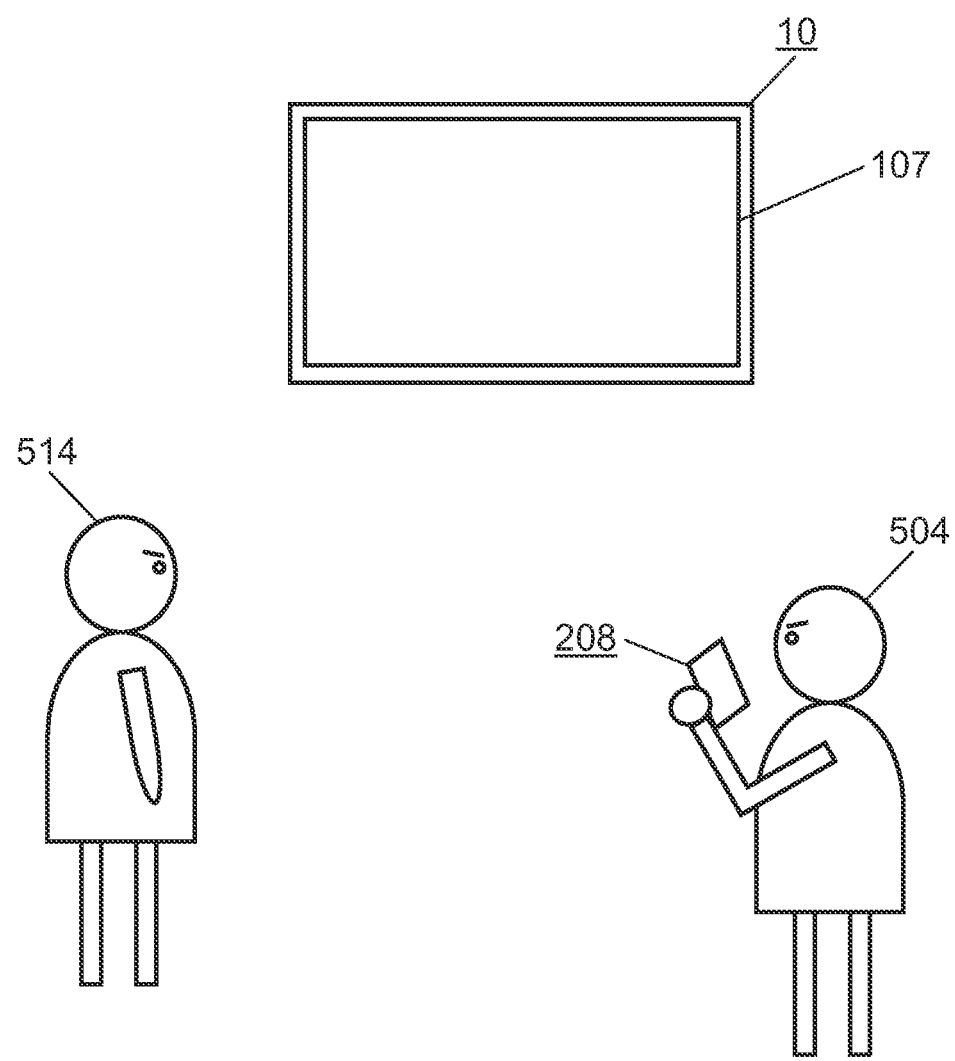
FIG. 11A is a schematic view illustrating an example of situations where a viewer holding the mobile terminal coexist with a viewer holding no mobile terminal, according to the first embodiment.

FIG. 11A is a schematic view illustrating an example of situations where a viewer holding mobile terminals 20 coexists with a viewer holding no mobile terminal 20, according to the first embodiment.

Figure 11B:
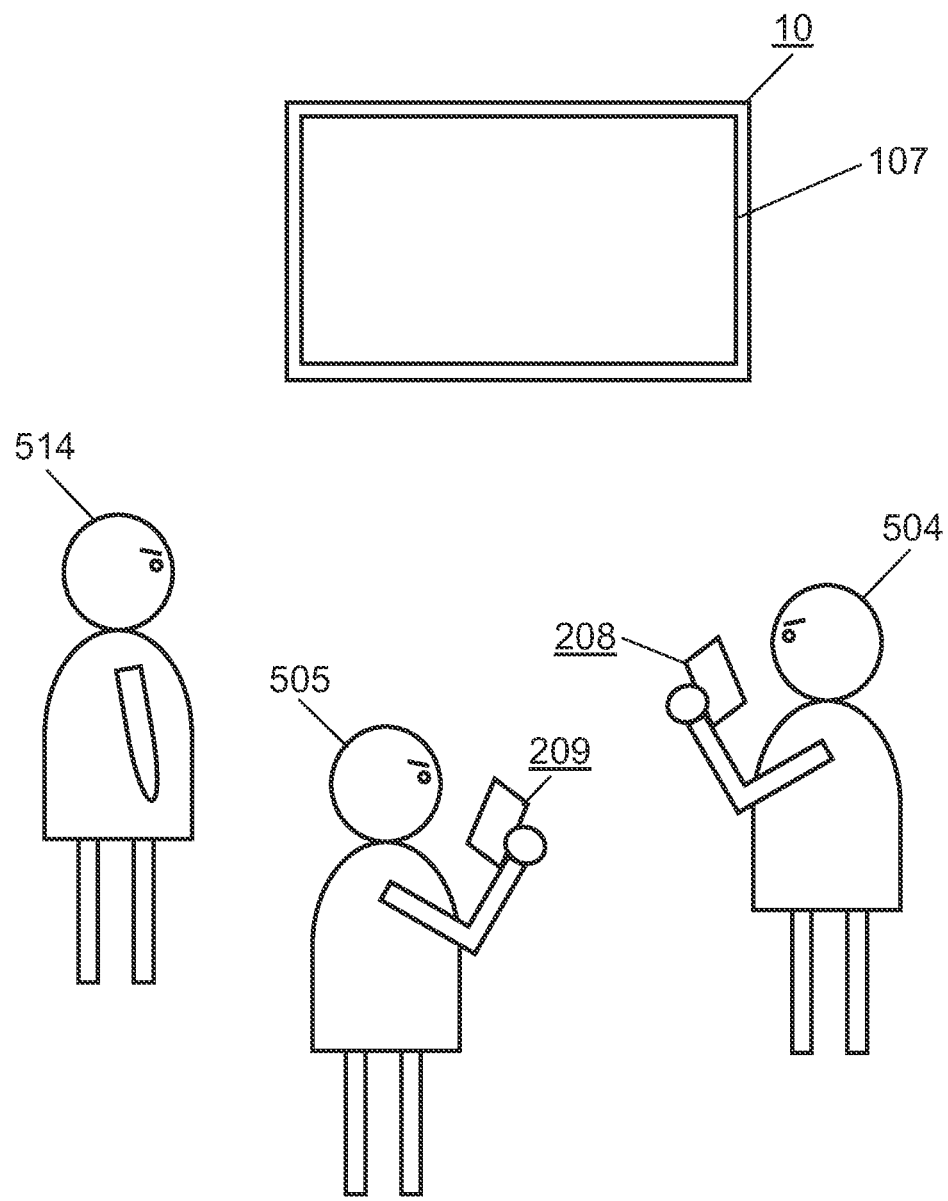
FIG. 11B is a schematic view illustrating another example of situations where viewers holding the mobile terminals coexist with a viewer holding no mobile terminal, according to the first embodiment.

FIG. 11B is a schematic view illustrating another example of situations where viewers holding mobile terminals 20 coexist with a viewer holding no mobile terminal 20, according to the first embodiment.

In the case shown in FIG. 11A, two viewers 504 and 514 are viewing a video content currently being displayed on first display 107 of video receiving apparatus 10. One, viewer 504, of the viewers is holding mobile terminal 208 that is currently being in communication with video receiving apparatus 10. The other, viewer 514, of the viewers is not holding any mobile terminal 20 (or, alternatively, viewer 514 is holding mobile terminal 20 not being in communication with video receiving apparatus 10).

In the case shown in FIG. 11B, three viewers 504, 505, and 514 are viewing a video content currently being displayed on first display 107. Viewer 504 is holding mobile terminal 208 that is currently being in communication with video receiving apparatus 10. Viewer 505 is holding mobile terminal 209 currently being in communication with video receiving apparatus 10. Viewer 514 is not holding any mobile terminal 20 (or, alternatively, viewer 514 is holding mobile terminal 20 not being in communication with video receiving apparatus 10).

Note that mobile terminals 208 and 209 are each substantially equivalent to mobile terminal 20.

Figure 12A:
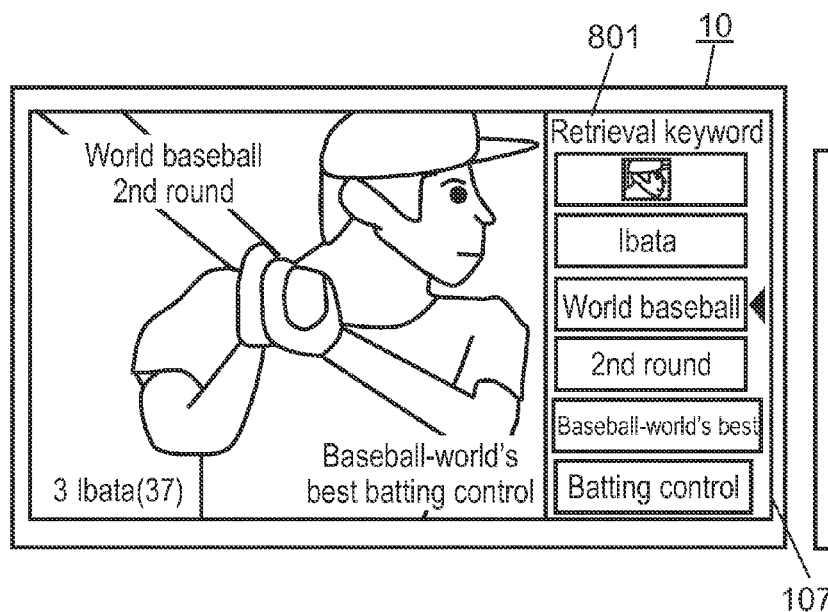
FIG. 12A is a view illustrating an example of the configuration information that is displayed on the first display of the video receiving apparatus when viewers holding mobile terminals coexist with viewers holding no mobile terminal, according to the first embodiment.

FIG. 12A is a view illustrating an example of configuration information that is displayed on first display 107 of video receiving apparatus 10 when a viewer(s) holding mobile terminal(s) 20 coexists (coexist) with a viewer(s) holding no mobile terminal 20, according to the first embodiment.

Figure 12C:
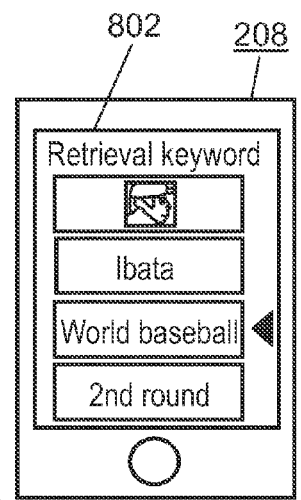
FIG. 12C is a view illustrating an example of the configuration information that is displayed on the second display of the mobile terminal when viewers holding mobile terminals coexist with viewers holding no mobile terminal, according to the first embodiment.
Figure 12B:
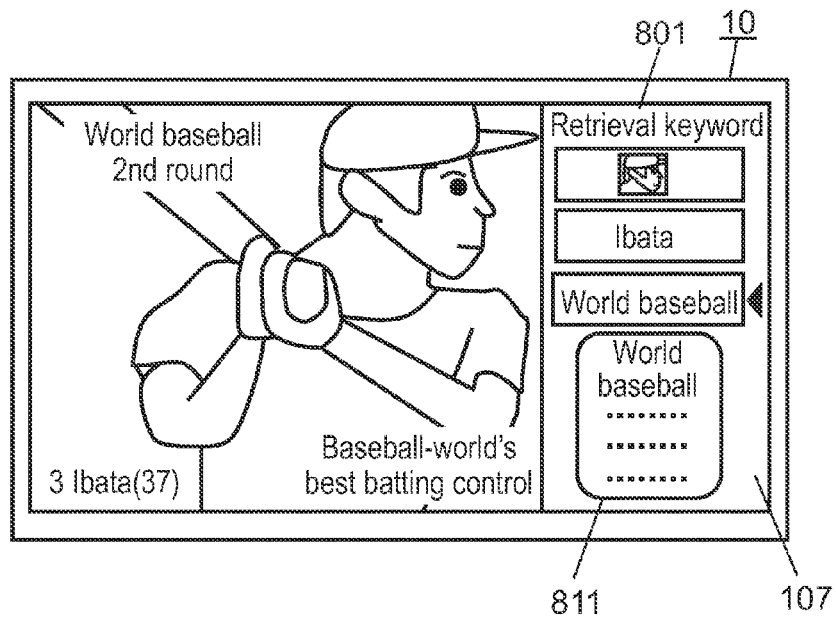
FIG. 12B is a view illustrating an example of the associated information that is displayed on the first display of the video receiving apparatus when viewers holding mobile terminals coexist with viewers holding no mobile terminal, according to the first embodiment.

FIG. 12B is a view illustrating an example of associated information that is displayed on first display 107 of video receiving apparatus 10 when a viewer(s) holding mobile terminal(s) 20 coexists (coexist) with a viewer(s) holding no mobile terminal 20, according to the first embodiment.

For example, when a part of a plurality of the viewers are not holding any mobile terminal 20 as shown in the exemplified cases in FIGS. 11A and 11B, in order to show the configuration information formed in Step S23 to the part of the viewers, display controller 106 displays image 801 on first display 107. The image shows the configuration information, as shown in the exemplified case in FIG. 12A (Step S59).

Next, when the viewer (e.g. viewer 514) of the video content currently being displayed on first display 107 selects one from a plurality of pieces of the configuration information currently being displayed on first display 107, display controller 106 acquires the associated information associated with the thus-selected piece of the configuration information from retrieval apparatus 18. Then, in order to show the acquired associated information to the viewer (viewer 514) who has made the selection, display controller 106 displays image 811 in a region within image 801 currently being displayed on first display 107. The image shows the acquired associated information, as shown in the exemplified case in FIG. 12B (Step S61).

At that time, display controller 106 does not display the associated information that is being displayed on first display 107, on second display 202.

FIG. 12C is a view illustrating an example of the configuration information that is displayed on second display 802 of mobile terminal 208 when a viewer(s) holding mobile terminal(s) 20 coexists (coexist) with a viewer(s) holding no mobile terminal 20, according to the first embodiment.

Figure 12D:
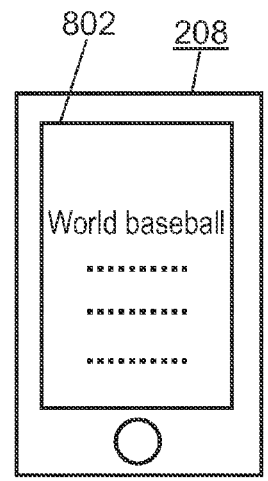
FIG. 12D is a view illustrating an example of the associated information that is displayed on the second display of the mobile terminal when viewers holding mobile terminals coexist with viewers holding no mobile terminal, according to the first embodiment.

FIG. 12D is a view illustrating an example of the associated information that is displayed on second display 802 of mobile terminal 208 when a viewer(s) holding mobile terminal(s) 20 coexists (coexist) with a viewer(s) holding no mobile terminal 20, according to the first embodiment.

For example, as shown in the exemplified cases in FIGS. 11A and 11B, when the part of the plurality of the viewers are each holding mobile terminal 20 currently being in communication with video receiving apparatus 10, the configuration information can be shown to the part of the viewers by displaying the configuration information on second displays 202 of their mobile terminals 20. At that time, display controller 106 operates such that the associated information, which is displayed on first display 107 as exemplified in FIG. 12B, is not displayed on second displays 202. This allows prevention of such inconvenience, for the viewers holding mobile terminals 20, that the associated information not desired by the viewers is displayed on second displays 202 of the viewer's terminals. With this configuration, for example, it is also possible to prevent a decrease in the amount of the configuration information displayed on second displays 202 due to such associated information displayed undesirably for the viewers.

In this way, in the embodiment, when the viewer(s) holding mobile terminal(s) 20 coexists (coexist) with the viewer(s) holding no mobile terminal 20, display controller 106 displays the configuration information formed in Step S23, on each of second display(s) 202 of all of mobile terminal(s) 20 that is (are) identified by the ID(s) which communicator 104 has received in advance (the mobile terminal being mobile terminal 208 for the case shown in FIG. 11A, the mobile terminals being mobile terminals 208 and 209 for the case shown in FIG. 11B) (Step S59). At that time, however, display controller 106 does not display the associated information on second display 202, with the associated information being to be displayed on first display 107 in Step S61.

FIG. 12C is a view illustrating an example of the case where the configuration information formed in Step S23 is displayed on second display 802 of mobile terminal 208. In the embodiment, the configuration information as shown in the exemplified case in FIG. 12C is displayed on second displays 202 of all of mobile terminals 20 that are currently being in communication with video receiving apparatus 10. Note that second display 802 is substantially equivalent to second display 202.

Next, when the viewer holding mobile terminal 20 selects one from a plurality of pieces of the configuration information which is currently being displayed on second display 202, the selected piece of the configuration information is transmitted from mobile terminal 20 of the viewer to video receiving apparatus 10.

Video receiving apparatus 10 receives the configuration information transmitted from mobile terminal 20 and then acquires associated information associated with the received configuration information from retrieval apparatus 18. Then, video receiving apparatus 10 transmits the thus-acquired associated information to mobile terminal 20 from which the configuration information has been transmitted. Mobile terminal 20, from which the configuration information has been transmitted, receives the associated information and displays the associated information on second display 202 (Step S62).

FIG. 12D is a view illustrating an example of the case where viewer 504 holding mobile terminal 208 selects one from the plurality of pieces of the configuration information which is currently being displayed on second display 802, and the associated information associated with the thus-selected piece of the configuration information is displayed on second display 802 of mobile terminal 208. In the embodiment, the associated information as shown in the exemplified case in FIG. 12D is displayed on second display 202 of mobile terminal 20 with which the selection of the configuration information has been made, with the configuration information having served as a base for the formation of the associated information. Note that, although FIG. 12D shows the case where only the associated information is displayed on the entire screen of second display 802, both the configuration information and the associated information may be displayed simultaneously on second display 202.

At that time, display controller 106 does not display the associated information on first display 107. Moreover, display controller 106 displays the associated information associated with the configuration information only on second display 202 of mobile terminal 20 with which the selection of the configuration information has been made, and does not display this associated information on any second displays 202 of the other mobile terminals 20.

Therefore, the viewer holding mobile terminal 20 can check the associated information associated with the configuration information which the viewer has selected, through use of mobile terminal 20 held in viewer's hand. As for the other viewers, the associated information, which is not desired by the other viewers, is prevented from being displayed on first display 107 or second displays 202. With this configuration, for the other viewers, it is also possible to prevent a decrease in the amount of the configuration information displayed on either first display 107 or second displays 202 due to such associated information displayed undesirably for these viewers.

Note that mobile terminal 20 may transmit the configuration information together with its own ID to video receiving apparatus 10. This transmission allows video receiving apparatus 10 to grasp which mobile terminal 20 has transmitted the configuration information. Then, when transmitting the associated information associated with the configuration information, video receiving apparatus 10 can transmit the associated information to mobile terminal 20 that is identified by the ID.

Note that, when the viewer selects the configuration information through use of second display 202 of mobile terminal 20 held in viewer's hand, the information transmitted from mobile terminal 20 to video receiving apparatus 10 is not necessarily the selected configuration information itself. Instead of this, the information transmitted from mobile terminal 20 to video receiving apparatus 10 may be information (e.g. a header of the configuration information, or the like) for specifying the selected piece of the configuration information.

[1-3. Effect and Others]

As described above, in the embodiment, video receiving apparatus 10 includes receiver 101, first display 107, extractor 102, information forming controller 103, number-of-viewer detector 105, communicator 104, and display controller 106. Receiver 101 is configured to receive a video content. First display 107 is configured to display the video content received by receiver 101. Extractor 102 is configured to extract a partial content from the video content. Information forming controller 103 is configured to form, from the partial content, configuration information containing a character string or an image, relating to the partial content. Number-of-viewer detector 105 is configured to detect the number of viewers present within a predetermined area. Communicator 104 is configured to receive an identifier (ID) of mobile terminal 20 when the ID is transmitted from a single or a plurality of mobile terminals 20 which each includes second display 202. Display controller 106 is configured to be capable of transmitting the configuration information, selectively on the basis of the ID, to mobile terminal 20 identified by the ID, and capable of displaying the configuration information on second display 202. The display controller is also configured to display the configuration information on at least one of first display 107 and second display 202, on the basis of both the number-of-viewer and the number-of-ID.

With this configuration, video receiving apparatus 10 is allowed to display the configuration information, which relates to the video content currently being displayed on first display 107, on first display 107 and/or second display(s) 202 of mobile terminal(s) 20 identified by the ID(s), on the basis of both the number-of-viewer and the number-of-ID. Accordingly, video receiving apparatus 10 is capable of appropriately showing the configuration information to the viewer(s) on the basis of both the number-of-viewer and the number-of-ID.

Moreover, in video receiving apparatus 10, display controller 106 may be configured to display the configuration information on second display(s) 202 of mobile terminal(s) 20 identified by the ID(s) when the number-of-ID is not less than 1 (one).

With this configuration, video receiving apparatus 10 is allowed to display the configuration information relating to the video content, which is currently being displayed on first display 107, on second display(s) 202 of mobile terminal(s) 20 identified by the ID(s). Accordingly, the viewer who is viewing the video content currently being displayed on first display 107 can check the configuration information relating to the video content, through use of mobile terminal 20 held in viewer's hand.

Furthermore, in video receiving apparatus 10, display controller 106 may be configured to display the configuration information on first display 107 when the number-of-viewer is larger than the number-of-ID.

With this configuration, video receiving apparatus 10 is allowed to display, on first display 107, the configuration information relating to the video content currently being displayed on first display 107. Accordingly, the viewer not holding mobile terminal 20 can check, with first display 107, the configuration information relating to the video content currently being displayed on first display 107.

Moreover, in video receiving apparatus 10, display controller 106 may be configured to display the configuration information on first display 107 and every second display 202 of mobile terminal(s) 20 identified by the ID(s), when the number-of-ID is not less than 1 (one) and the number-of-viewer is larger than the number-of-ID.

With this configuration, video receiving apparatus 10 is allowed to display the configuration information relating to the video content currently being displayed on first display 107, on first display 107 and every second display 202 of mobile terminal(s) 20 identified by the ID(s). Accordingly, the viewer holding mobile terminal 20 can check the configuration information relating to the video content through use of mobile terminal 20 held in viewer's hand, while the viewer holding no mobile terminal 20 can check, with first display 107, the configuration information relating to the video content.

Furthermore, in video receiving apparatus 10, display controller 106 may be configured such that, when the number-of-viewer equals the number-of-ID, the display controller displays the configuration information on second display(s) 202 of mobile terminal(s) 20 identified by the ID(s), without displaying the configuration information on first display 107.

With this configuration, when all the viewers viewing the video content currently being displayed on first display 107 are each holding mobile terminal 20 currently being in communication with video receiving apparatus 10, video receiving apparatus 10 is allowed to display the configuration information on second display(s) 202 of mobile terminal(s) 20 identified by the ID(s), without displaying the configuration information on first display 107. Accordingly, when all the viewers are each holding mobile terminal 20 currently being in communication with video receiving apparatus 10, the configuration information is not displayed on first display 107, which prevents a decrease in viewability of the video content currently being displayed on first display 107 due to the display of the configuration information.

Moreover, in video receiving apparatus 10, display controller 106 may be configured to display the configuration information in the following manner: When the number-of-ID is not smaller than 1 (one), the controller displays the configuration information on second display(s) 202 of mobile terminal(s) 20 identified by the ID(s). When the number-of-viewer is larger than the number-of-ID, the controller displays the configuration information on first display 107. When the number-of-viewer equals the number-of-ID, the controller displays the configuration information on second display(s) 202 of mobile terminal(s) 20 identified by the ID(s), without displaying the configuration information on first display 107.

With this configuration, video receiving apparatus 10 is capable of appropriately showing the configuration information to the viewer(s) on the basis of both the number-of-viewer and the number-of-ID.

In addition, in video receiving apparatus 10, communicator 104 may be configured to be capable of transmitting and receiving data via network 16, and may be configured to acquire, via network 16, the information (associated information) associated with the configuration information which has been selected through use of second display 202. Moreover, display controller 106 may be configured to display the information (associated information) acquired by communicator 104, on second display 202 of mobile terminal 20 with which the selection of the configuration information has been made.

With this configuration, video receiving apparatus 10 is allowed to selectively display the associated information associated with the configuration information, on second display 202 of mobile terminal 20 with which the selection of the configuration information has been made. Accordingly, the viewer who has selected the configuration information through use of second display 202 can check, with second display 202, the associated information associated with the selected piece of the configuration information. This further allows the prevention of the following inconvenience: That is, an unpleasant decrease in viewability of the video content due to the associated information displayed on first display 107; and an unpleasant display of the associated information on second display 202 of mobile terminal 20, with the associated information being associated with the configuration information that has been selected by another viewer—somebody else (that is, such associated information is not desired by the viewer holding mobile terminal 20 concerned).

Moreover, in video receiving apparatus 10, communicator 104 may be configured to be capable of transmitting and receiving data via network 16, and may be configured to acquire, via network 16, the information (associated information) associated with the configuration information which has been selected through use of first display 107. Display controller 106 may be configured to display, on first display 107, the information (associated information) acquired by communicator 104.

With this configuration, video receiving apparatus 10 is allowed to display, on first display 107, the associated information associated with the configuration information that has been selected through use of first display 107. Accordingly, the viewer not holding mobile terminal 20 can check, with first display 107, the information (associated information) desired by the viewer.

Moreover, a method of displaying information according to the embodiment includes the following steps: That is, a step of receiving a video content; a step of displaying the video content on first display 107; a step of extracting a partial content from the video content; a step of forming, from the partial content, configuration information containing a character string or an image, relating to the partial content; a step of detecting the number of viewers present within a predetermined area; a step of receiving an ID of mobile terminal 20 when the ID is transmitted from a single or a plurality of mobile terminals 20 which each include second display 202; and a step of displaying the configuration information on at least one of first display 107 and second display(s) 202 of mobile terminal(s) 20 identified by the ID(s), on the basis of both the number-of-viewer and the number-of-ID.

With this configuration, video receiving apparatus 10 is allowed to display the configuration information, which relates to the video content currently being displayed on first display 107, on first display 107 and/or second display(s) 202 of mobile terminal(s) 20 identified by the ID(s), on the basis of both the number-of-viewer and the number-of-ID. Accordingly, video receiving apparatus 10 is capable of appropriately showing the configuration information to the viewer(s) on the basis of both the number-of-viewer and the number-of-ID.

Moreover, video receiving system 100 according to the embodiment includes video receiving apparatus 10 including first display 107, and a single or a plurality of mobile terminals 20 each including second display 202. Video receiving apparatus 10 includes receiver 101, first display 107, extractor 102, information forming controller 103, number-of-viewer detector 105, communicator 104, and display controller 106. Receiver 101 is configured to receive a video content. First display 107 is configured to display the video content received by receiver 101. Extractor 102 is configured to extract a partial content from the video content. Information forming controller 103 is configured to form, from the partial content, configuration information containing a character string or an image, relating to the partial content. Number-of-viewer detector 105 is configured to detect the number of viewers present within a predetermined area. Communicator 104 is configured to receive an identifier (ID) of mobile terminal 20 when the ID is transmitted from the single or the plurality of mobile terminals 20. Display controller 106 is configured to be capable of transmitting, selectively on the basis of the ID, the configuration information to mobile terminal 20 identified by the ID, and capable of displaying the configuration information on second display 202. The display controller is also configured to display the configuration information on at least one of first display 107 and second display(s) 202, on the basis of both the number-of-viewer and the numberof-ID. Mobile terminal 20 is configured to transmit its own ID to video receiving apparatus 10, to receive the configuration information transmitted from video receiving apparatus 10, and to display the thus-received configuration information on second display 202.

With this configuration, video receiving apparatus 10 is allowed to display the configuration information, which relates to the video content currently being displayed on first display 107, on first display 107 and/or second display(s) 202 of mobile terminal(s) 20 identified by the ID(s), on the basis of both the number-of-viewer and the number-of-ID. Accordingly, video receiving apparatus 10 is capable of appropriately showing the configuration information to the viewer(s) on the basis of both the number-of-viewer and the number-of-ID.

Other Exemplary Embodiments

As described above, the first embodiment has been described to exemplify the technology disclosed in the present application. However, the technology disclosed herein is not limited to the embodiment, and is also applicable to embodiments that are subjected, as appropriate, to various changes and modifications, replacements, additions, omissions, and the like. Moreover, the technology disclosed herein also allows another embodiment which is configured by combining the appropriate constituent elements in the first embodiment described above.

Then, other embodiments will be exemplified hereinafter.

For example, video receiving apparatus 10 may be configured such that, when not smaller than 2 (two) viewers are present who are each holding mobile terminal 20, display controller 106 collects individual information from these mobile terminals 20 and displays configuration information on first display 107 and second display(s) 202, in accordance with the thus-collected individual information. For example, as to pieces of the individual information collected from each of mobile terminals 20, display controller 106 may be configured to display the configuration information common between/among the pieces on first display 107, and to display the configuration information not common between/among the pieces on second display(s) 202 in accordance with the individual information.

A description will be made regarding an example of the configuration information which is displayed on first display 107 and second display 202 in accordance with the individual information, with reference to the accompanying drawings. Not that the following description is made for a situation where the individual information is an operation history (retrieval history) accumulated in mobile terminal 20.

Figure 13A:
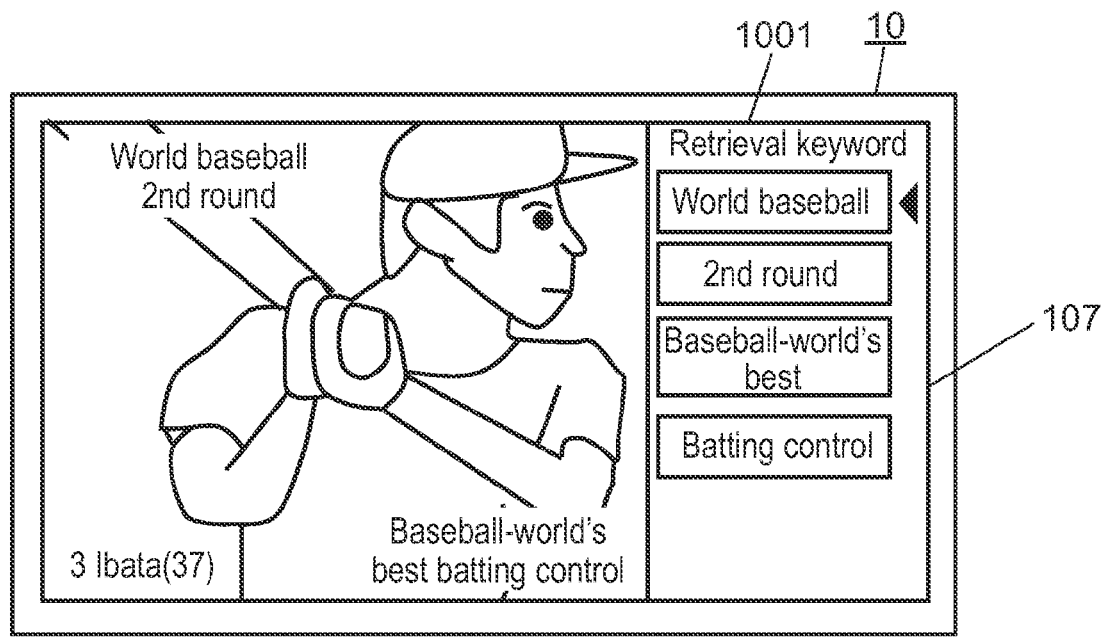
FIG. 13A is a view illustrating an example of configuration information that is displayed on the first display of the video receiving apparatus based on individual information collected from a plurality of mobile terminals, according to another embodiment.

FIG. 13A is a view illustrating an example of configuration information that is displayed on first display 107 of video receiving apparatus 10 in accordance with the individual information collected from a plurality of mobile terminals 210 and 211, according to another embodiment.

Figure 13B:
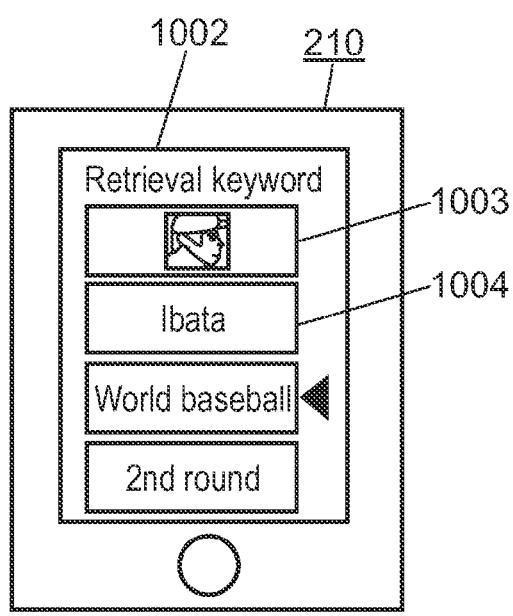
FIG. 13B is a view illustrating an example of configuration information that is displayed on the second display of the mobile terminal based on individual information collected from the mobile terminal, according to the another embodiment.

FIG. 13B is a view illustrating an example of configuration information that is displayed on second display 1002 of mobile terminal 210 in accordance with the individual information collected from mobile terminal 210, according to the another embodiment.

Figure 13C:
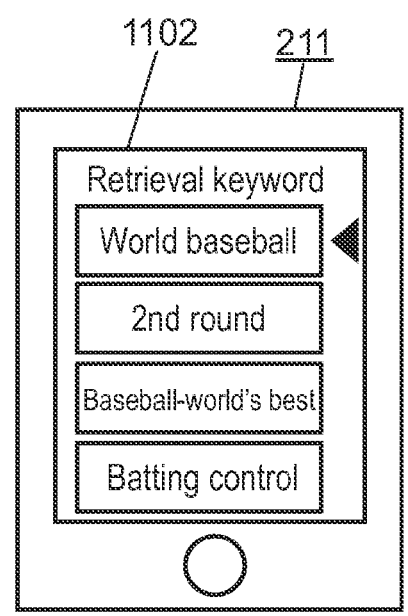
FIG. 13C is a view illustrating an example of configuration information that is displayed on the second display of the mobile terminal based on individual information collected from the mobile terminal, according to the another embodiment.

FIG. 13C is a view illustrating an example of configuration information that is displayed on second display 1102 of mobile terminal 211 in accordance with the individual information collected from mobile terminal 211, according to the another embodiment.

Note that, although not shown, it is assumed in the description that at least two viewers are viewing a video content currently being displayed on first display 107 of video receiving apparatus 10; one viewer is holding mobile terminal 210 currently being in communication with video receiving apparatus 10, while the other viewer is holding mobile terminal 211 currently being in communication with video receiving apparatus 10. Mobile terminals 210 and 211 are each substantially equivalent to mobile terminal 20.

For example, when the individual information is operation histories (retrieval histories) accumulated in mobile terminal 20, display controller 106 can grasp tendencies in viewer's tastes from their individual information.

A further assumption is given, for example, as follows: The individual information transmitted from mobile terminal 210 contains a relatively large amount of the operation histories (retrieval histories) concerning both baseball and a player currently being displayed in first display 107. The individual information transmitted from mobile terminal 211 contains a relatively large amount of the operation history (retrieval history) concerning baseball, and a relatively small amount (or nothing) of the operation history (retrieval history) concerning the player currently being displayed in first display 107.

In this case, display controller 106 can determine that "the configuration information concerning baseball," which is common among pieces of the individual information, must be a common matter of concern of both the viewer holding mobile terminal 210 and the viewer holding mobile terminal 211. Then, display controller 106 extracts a piece of configuration information concerning baseball from a plurality of pieces of the configuration information formed from the video content, and displays the thus-extracted configuration information on first display 107, as shown in the exemplified case in FIG. 13A, for example.

In contrast, display controller 106 can determine that the configuration information concerning the baseball player currently being displayed on first display 107 must be a matter of concern of only the viewer who is holding mobile terminal 210. Then, the display controller displays the configuration information concerning the baseball player only on second display 1002 of mobile terminal 210, without displaying the configuration information on first display 107, as shown in the exemplified case in FIG. 13B. Moreover, as to mobile terminal 211, when the individual information transmitted from mobile terminal 211 contains a relatively large amount of an operation history (retrieval history) concerning another matter, display controller 106 displays configuration information relating to the matter on second display 1102 of mobile terminal 211. Unless such a matter is particularly contained in the individual information, the display controller may display, on second display 1102 of mobile terminal 211, the same configuration information as that currently being displayed on first display 107, as shown in the exemplified case in FIG. 13C, for example.

Note that second displays 1002 and 1102 are each substantially equivalent to second display 202.

Video receiving apparatus 10 and mobile terminal(s) 20 may be configured to perform such operations described above, for example.

Note that mobile terminal 20 may transmit the individual information together with the ID to video receiving apparatus 10, with the same timing as for transmitting the ID, for example. Video receiving apparatus 10 may be configured to cause the operation histories (retrieval histories) of mobile terminals 20 to be connected to the respective IDs of mobile terminals 20, and then stores them in a storage unit (not shown).

It is noted, however, that the individual information is not limited to the operation history(ies) (retrieval history[ies]). For example, the individual information may be various kinds of information on the viewer, such as age, sex, a native place, a parent organization or group, or interests, etc. Moreover, the configuration may be such that the individual information is registered in advance at mobile terminals 20 and transmitted together with the ID to video receiving apparatus 10. Alternatively, the individual information may be registered in advance at video receiving apparatus 10, with the individual information being connected to the ID.

In the first embodiment, the description has been made regarding the configuration in which video receiving apparatus 10 includes first display 107; however, the video receiving apparatus may include no first display 107.

Figure 14:
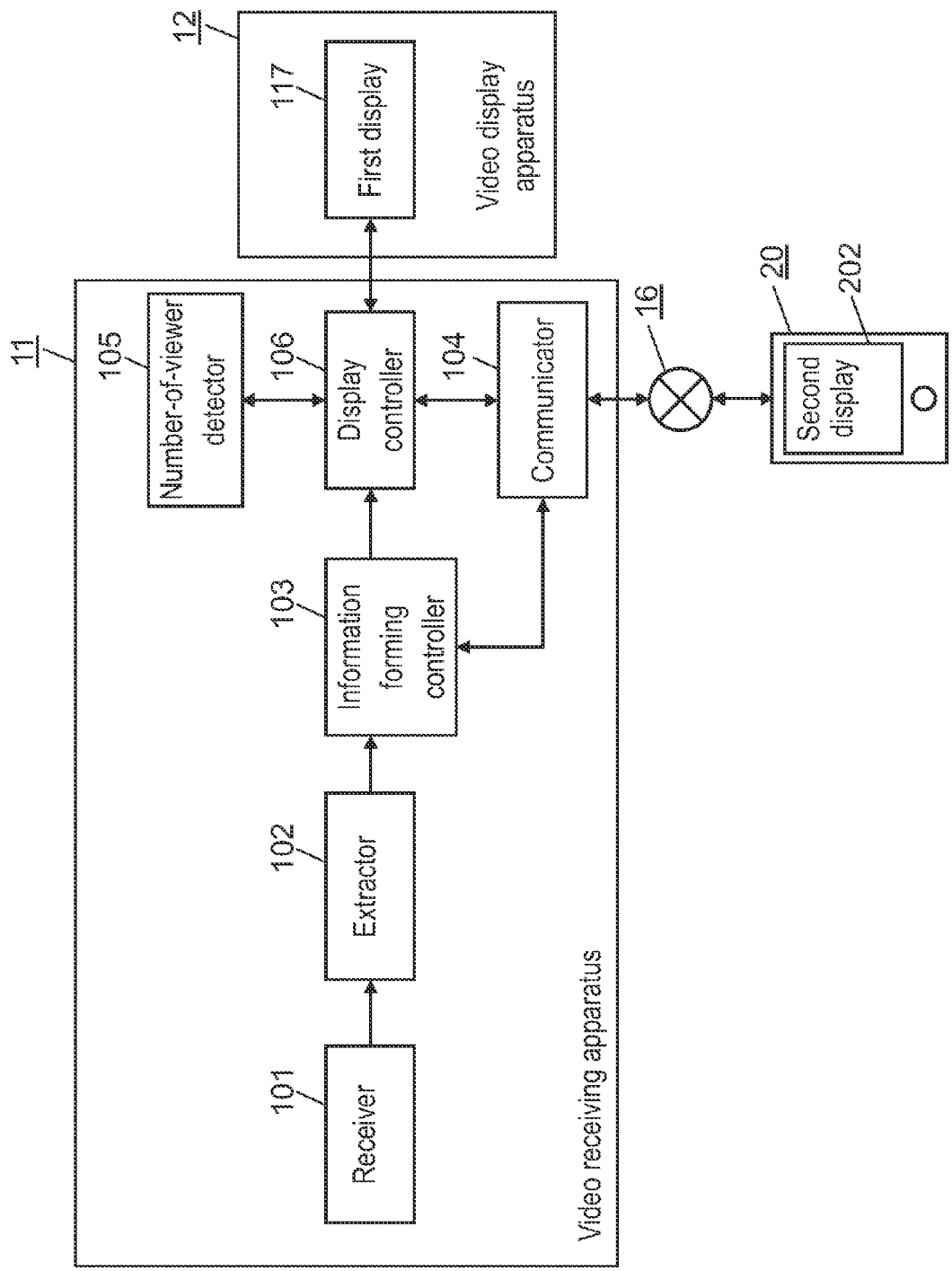
FIG. 14 is a schematic block diagram of an example of a configuration of a video receiving apparatus according to yet another embodiment.

FIG. 14 is a schematic block diagram of an example of a configuration of video receiving apparatus 11 according to another embodiment.

Note that, in FIG. 14, constituent elements which perform substantially the same operations as those performed by the constituent elements configuring video receiving apparatus 10 shown in FIG. 2, are designated by the same numerals and symbols, and their descriptions are omitted. Moreover, in FIG. 14, only major blocks relating to operations to be described in this embodiment are shown, and other blocks and functions (e.g. a video recording function) relating to other operations are omitted.

Video receiving apparatus 11 shown in FIG. 14 includes no first display. Video receiving apparatus 11 is configured such that display controller 106 outputs a video signal to video display apparatus 12 installed on the outside, via wired or wireless communications. First display 117 included in video display apparatus 12 displays video, configuration information, associated information, and the like in accordance with the video content.

Even with video receiving apparatus 11 having such a configuration, for example, it is possible to provide substantially the same advantages as those of video receiving apparatus 10 described in the first embodiment.

Note that among examples of such video receiving apparatus 11 are video recording-reproducing apparatuses including a hard-disk recorder, DVD recorder, or BD recorder, for example.

Note that, in the embodiments, the case of the operations has been described in which, when the number-of-viewer is equal to the number-of-ID, i.e. all the viewers are each holding mobile terminal 20 currently being in communication with video receiving apparatus 10, display controller 106 does not display the configuration information and/or associated information on first display 107. However, display controller 106 may display the configuration information and/or associated information on first display 107.

It is noted, however, that each of the constituent elements described in the embodiments may be configured with an independent dedicated circuit or, alternatively, configured to be implemented by executing, with a processor, a program which is formed to perform a single or a plurality of operations of each of the constituent elements. Moreover, such a program may be acquired by downloading from a server or the like, or acquired via a predetermined record medium (for example, an optical disk such as CD-ROM, a magnetic disk, a semiconductor memory, or the like).

Note that, the specific numerical values described in the embodiments are nothing more than the examples of the embodiments, and the present disclosure is not limited to these values. Each of the numerical values is preferably optimally set in accordance with specifications and the like of the video receiving apparatus.

Moreover, the retrieval operations of retrieval apparatus 18 described in the embodiments may be performed by centralized processing with a single server, or by decentralized processing with a plurality of servers.

INDUSTRIAL APPLICABILITY

The technology according to the present disclosure is applicable to video receiving apparatuses which are each capable of forming configuration information relating to a video content imputted from the outside, and capable of displaying the thus-formed configuration information on a first display and a second display of a mobile terminal. Specifically, the technology is applicable to television receivers, hard-disk recorders, DVD recorders, BD recorders, and the like.

REFERENCE MARKS IN THE DRAWINGS 10, 11 video receiving apparatus
16 network
18 retrieval apparatus
12 video display apparatus
20, 205, 206, 207, 208, 209, 210, 211 mobile terminal
30, 601, 701, 711, 801, 811, 1001 image
40 association table
100 video receiving system
101 receiver
102 extractor
103 information forming controller
104 communicator
105 number-of-viewer detector
106 display controller
107, 117 first display
202, 602, 802, 1002, 1102 second display
301, 302, 303, 304 partial content
401 object image
402, 403, 404, 405 character string
501, 502, 503, 504, 505, 511, 512, 513, 514 viewer

The invention claimed is:

1. A video receiving apparatus, comprising:
a receiver for receiving a video content;
a first display for displaying the video content;
an extractor for extracting a partial content from the video content;
an information forming controller for forming, from the partial content, configuration information containing a character string associated with the partial content or an image associated with the partial content;
a number-of-viewer detector for detecting a number of viewers who are watching the first display and present within a predetermined area in front of the first display;
a communicator for receiving an identifier identifying a mobile terminal including a second display when the identifier is transmitted from a single or a plurality of the mobile terminals, the single or the plurality of mobile terminals being carried by one or more of the viewers; and
a display controller for transmitting the configuration information, selectively based on the identifier, to the mobile terminal identified by the identifier, and displaying the configuration information on the second display, wherein the display controller displays the configuration information on at least one of the first display and the second display, based on the number of viewers and a number of identifiers, and
the partial content includes at least one of an image and a sound contained in the video content.

2. The video receiving apparatus according to claim 1, wherein, when the number of identifiers is not smaller than one, the display controller displays the configuration information on the second display of the mobile terminal identified by the identifier.

3. The video receiving apparatus according to claim 1, wherein, when the number of viewers is larger than the number of the identifier, the display controller displays the configuration information on the first display.

4. The video receiving apparatus according to claim 1, wherein, when the number of identifiers is not smaller than one and yet when the number of viewers is larger than the number of identifiers, the display controller displays the configuration information on the first display and the second display of the mobile terminal identified by the identifier.

5. The video receiving apparatus according to claim 1, wherein, when the number of viewers equals the number of identifiers, the display controller does not display the configuration information on the first display but displays the configuration information on the second display of the mobile terminal identified by the identifier.

6. The video receiving apparatus according to claim 1,
wherein, when the number of identifiers is not smaller than one, the display controller displays the configuration information on the second display of the mobile terminal identified by the identifier;
when the number of viewers is larger than the number of identifiers, the display controller displays the configuration information on the first display; and,
when the number of viewers equals the number of identifiers, the display controller does not display the configuration information on the first display but displays the configuration information on the second display of the mobile terminal identified by the identifier.

7. The video receiving apparatus according to claim 2,
wherein the communicator is configured to transmit and receive data via a communication line and acquires, via the communication line, information associated with the configuration information selected by using the second display; and
the display controller displays the associated information acquired by the communicator on the second display of the mobile terminal with which the configuration information has been selected.

8. The video receiving apparatus according to claim 3,
wherein the communicator is configured to transmit and receive data via a communication line and acquires, via the communication line, information associated with the configuration information selected by using the first display; and
the display controller displays the associated information acquired by the communicator on the first display.

9. The video receiving apparatus according to claim 2, wherein, when the number of identifiers is not smaller than one, the display controller acquires individual information from the mobile terminal identified by the identifier, selects not smaller than one piece of the configuration information based on the individual information, and displays the selected piece of the configuration information on the second display of the mobile terminal from which the individual information is acquired.

10. The video receiving apparatus according to claim 2, wherein, when the number of identifiers is not smaller than two, the display controller acquires individual information from each of the mobile terminals identified by the identifiers, selects not smaller than one piece of the configuration information based on the individual information, specifies a piece of the configuration information common to the selected pieces of the configuration information, and displays the specified piece of the configuration information on the first display.

11. A method of displaying information in a video receiving apparatus including a first display, the method comprising the steps of:
receiving a video content;
displaying the video content on the first display;
extracting a partial content from the video content;
forming, from the partial content, configuration information containing a character string associated with the partial content or an image associated with the partial content;
detecting a number of viewers who are watching the first display and present within a predetermined area in front of the first display;
receiving an identifier identifying a mobile terminal including a second display when the identifier is transmitted from a single or a plurality of the mobile terminals, the single or the plurality of mobile terminals being carried by one or more of the viewers; and
displaying the configuration information on at least one of the first display and the second display of the mobile terminal identified by the identifier, based on the number of viewers and a number of identifiers, and
the partial content includes at least one of an image and a sound contained in the video content.

12. A video receiving system, comprising:
a single or a plurality of mobile terminals each including a second display; and
a video receiving apparatus including:
a first display for displaying a video content;
a receiver for receiving the video content;
an extractor for extracting a partial content from the video content;
an information forming controller for forming, from the partial content, configuration information containing a character string associated with the partial content or an image associated with the partial content;
a number-of-viewer detector for detecting a number of viewers who are watching the first display and present within a predetermined area in front of the first display;
a communicator for receiving an identifier identifying the mobile terminal when the identifier is transmitted from the mobile terminal, the mobile terminal being carried by one of the viewers; and
a display controller for transmitting the configuration information, selectively based on the identifier, to the mobile terminal identified by the identifier, and displaying the configuration information on the second display,
wherein the display controller displays the configuration information on at least one of the first display and the second display, based on the number of viewers and a number of identifiers,
the partial content includes at least one of an image and a sound contained in the video content, and the mobile terminal transmits the identifier to the video receiving apparatus, receives the configuration information transmitted from the video receiving apparatus, and displays the configuration information on the second display.

* * * * *